United States Patent
Higuchi et al.

(10) Patent No.: US 6,222,689 B1
(45) Date of Patent: Apr. 24, 2001

(54) SURFACE LIGHT SOURCE DEVICE AND ASYMMETRICAL PRISM SHEET

(75) Inventors: Eizaburo Higuchi, Setagaya-ku (JP); Yasuhiro Koike, 534-23, Ichigao-cho, Midori-ku, Yokohama, Kanagawa, 225-0002 (JP)

(73) Assignees: Enplas Corporation, Kawaguchi; Nitto Jushi Kogyo Kabushiki Kaisha, Tokyo; Yasuhiro Koike, Yokohama, all of (JP)

( * ) Notice: Subject to any disclaimer, the term of this patent is extended or adjusted under 35 U.S.C. 154(b) by 0 days.

(21) Appl. No.: 09/171,879

(22) PCT Filed: Mar. 10, 1998

(86) PCT No.: PCT/JP98/00984

§ 371 Date: Oct. 28, 1998

§ 102(e) Date: Oct. 28, 1998

(87) PCT Pub. No.: WO98/40664

PCT Pub. Date: Sep. 17, 1998

(30) Foreign Application Priority Data

Mar. 11, 1997 (JP) .................................................. 9-074551

(51) Int. Cl.$^7$ ...................................................... G02B 5/04
(52) U.S. Cl. ............................ 359/837; 362/31; 385/36; 349/62; 349/64
(58) Field of Search ............................... 362/31, 32, 29; 385/36; 359/837, 831, 832, 833, 834, 835, 836; 349/65, 61, 62

(56) References Cited

U.S. PATENT DOCUMENTS 5,711,589 * 1/1998 Oe et al. .................................. 362/31
5,779,351 * 7/1998 Erickson et al. ...................... 362/241
5,833,344 * 11/1998 Arai et al. ............................... 362/31

FOREIGN PATENT DOCUMENTS

| 2-84618 | 3/1990 | (JP) . |
| 8-286186 | 11/1996 | (JP) . |
| 9-160507 | 6/1997 | (JP) . |

* cited by examiner

*Primary Examiner*—Cassandra Spyrou
*Assistant Examiner*—Euncha Cherry
(74) *Attorney, Agent, or Firm*—Staas & Halsey LLP

(57) ABSTRACT

An asymmetric prism sheet, surface light source and LCD to which the asymmetric prism sheet is applied is provided. A cold cathode tube backed by a reflector supplies light to an incidence surface of a directional emission guide plate. A polarization separation sheet and a liquid crystal panel are disposed outside of the asymmetric prism sheet, with the reflector disposed along a back face. First and second slopes of each asymmetric prism element rows have inclination angles φa, φb which are selected as to allow a secondary ray to exist inside a main ray emitted from a frontal face in a manner such that the main ray is deflected toward a generally frontal direction by way of internal reflection of the second slope while the secondary ray is deflected toward a generally frontal direction by way of double internal reflection of the first and second slopes. An outer face provides an uneven face such as non-glare-processed face, orthogonal prismatic face or lens face. Outside of an outer face may be arranged elements such as additional prism sheet or lens sheet.

21 Claims, 24 Drawing Sheets

— : GUIDE PLATE A
— : GUIDE PLATE B

RELATION BETWEEN INCIDENCE ANGLE AND REFLECTION FACTOR
( VISIBLE LIGHT: n = 1.5 )

(Prior Art)

SURFACE LIGHT SOURCE DEVICE AND ASYMMETRICAL PRISM SHEET

FIELD OF THE INVENTION

The present invention relates to a surface light source device of side light type employing a directional emission guide plate and an(asymmetric prism sheet, and to an asymmetric prism sheet which can be applied to the device. In this specification, "asymmetric prism sheet" is an abbreviation for "sheet-like optical element having a prism surface which comprises a great number of asymmetric prism element rows".

BACKGROUND

A surface light source device employing a directional emission guide plate, comprising a light-scattering guide body or a light-permeable guide body and a prism sheet, has been proposed, and is widely applied for uses such as backlighting of a liquid crystal display. The prism sheet comprises a plate-like member of optical material, having a prism surface comprising a great number of prism element rows. It is known that such a prism sheet is capable of correcting propagation direction properties of light fluxes.

FIG. 1 shows a partial cutaway perspective of a diagrammatic constitution of a liquid crystal display which uses as backlighting a surface light source device of side light type, employing a conventional prism sheet. Thickness of the prism sheet 4 and other elements, as well as formation pitch, and depth and others, are exaggerated for conveniences of illustration.

As shown in FIG. 1, a directional emission guide plate 1 comprises an optical member, which is wedge-shaped in cross-section, having a light-scattering guide body or a light-permeable guide body. The scattering guide body is a known optical member which performs functions of guiding and internal scattering, comprising a matrix of, for instance, polymethyl-methacrylate (PMMA) and a "substance of different refractive index" which is mixed and dispersed uniformly in the matrix. "Different refractive index" means a substance having a refractive index which is actually different from that of the matrix.

The end face of the thick side of the guide plate 1 constitutes a light incidence surface 2, and a primary light source element (fluorescent lamp) L backed by a reflector R is provided near the incidence surface 2. A reflector 3 is provided over one major surface (under face) 6 of the guide plate 1. The reflector 3 comprises a frontal-reflecting silver-foil sheet or a diffused-reflecting white sheet. Illuminating light is extracted from the other major surface (light emission surface or light extraction surface) 5, which is the front surface of the guide plate 1. A prism sheet 4 is provided on the outer side of the front surface 5 with the prism surface facing inward.

In the explanatory cutaway portion, the outer face 4c of the prism sheet 4 is shown as an even surface. A liquid crystal panel LP is provided to the outer side of the even face 4c with a polarization separating sheet LS therebetween. The liquid crystal panel LP has a known constitution wherein a liquid crystal cell, light-permeable electrode and others sandwiched between two polarizing plates, arranged so that their axes of polarization intersect at a right angle.

The polarization separating sheet LS is an optical element in recent use, provided between the polarizing plate on the inner side of the liquid crystal panel and the prism sheet 4. This polarization separating sheet LS has high permittivity with respect to polarization components in the same direction as the polarization axis of the polarizing plate on the inner side, and high reflectivity with respect to polarization components in the direction at a right angle to the same polarizing plate.

Proposals for this type of polarization separating sheet LS include a multi-refractive polarizer (see Japan Patent Laid-Open Publication No. 4-295804), comprising a laminated arrangement of a great number of alternate layers of a first polymer substance, having a positive stress optical factor, and a second polymer substance, having a negative stress optical factor, or a polarizer made by providing alternate layers having high refractive index and low refractive index, selected to satisfy McNiall conditions, on a prism surface of one of a pair of light-permeable substrates, having isosceles-triangular prisms arranged in a straight line on one face thereof, and then optically connecting the pair of substrates with their prism surfaces facing each other (see Japan Patent Laid-Open Publication No. 6-51399), and such like.

Normally, a space (vacant layer) is provided between the liquid crystal panel LP and the polarization separating sheet LS, or between the liquid crystal panel LP and the prism sheet 4 (when a polarization separating sheet cannot be used), to prevent these elements from sticking to each other, but this space is not shown in the diagram.

The prism surface, which forms the inner surface of the prism sheet 4, has a great number of rows of prism elements. The great number of rows of prism elements are provided substantially parallel to the incidence surface 2 of the guide plate 1. As shown in the partial enlarged cross-sectional view, each row of prism elements has a pair of slopes 4a and 4b which form a V-shaped groove.

Hereinafter, in the present specification, the slope angle of the slope 4a, which faces the light incidence surface 2 of the guide plate 1, will be represented as $\phi a$, and the slope angle of the slope 4b facing the opposite side will be represented as $\phi b$. The slope angles $\phi a$ and $\phi b$ are defined with respect to the front surface direction (see reference numeral N). Many conventional devices use a symmetric prism sheet (i.e. $\phi a = \phi b$).

Light, sent from the light source element L into the guide plate 1, is subject to the scattering and reflection action within the guide plate 1 while being guided toward the end surface 7 of the thin side of the guide plate 1. Through this process, illuminating light is gradually emitted from the front surface 5.

As is well known, light emitted from the front surface 5 of the guide plate 1, which has received light supplied from the side, exhibits directivity of considerable clarity, and therefore such a guide plate 1 is known as a directional emission guide plate. When strong light diffusion properties are given to the front surface 5 or under face of the guide plate 1, the guide plate 1 may lose its property of directional emission. FIG. 2 and FIG. 3 are graphs illustrating emission characteristics of the front surface 5 of three example guide plates A (FIG. 2), B (FIG. 2) and C (FIG. 3).

In each of these graphs, the horizontal axis represents the direction of the brightness measurement. An angle of 0 degrees represents the frontal direction, minus represents the incidence surface 2 side and positive represents the end side (forward). The vertical axis represents relative brightness in unit (a.u.) to a peak value of 0.1. In FIG. 2, thick-line curve A represents characteristics of guide plate A, and thin-line curve B represents characteristics of guide plate B. And, in FIG. 3, curve C represents characteristics of guide plate C. The characteristics were measured using a brightness meter, to investigate brightness at different angles, in a plane perpendicular to the incidence surface 2, near a center point in the front face of guide plate. The distance from the brightness meter to the center point was 203 mm.

Each data of guide plate A to C are following:

Guide Plate A

Material: light-scattering guide body=silicon-type resin particles were uniformly dispersed at 0.08 wt % within a matrix of PMMA (polymethyl-methacrylate). The refractive index was approximately 1.5;

Size: depth when viewed from the light incidence surface side was 51.5 mm, width 68.3 mm; thickness of light incidence surface side end portion was 3.0 mm, with thickness of end surface portion being 0.2 mm.

Guide Plate B

Material: light-scattering guide body=silicon-type resin particles were uniformly dispersed at 0.025 wt % within a matrix of PMMA (polymethyl-methacrylate). The refractive index was approximately 1.5;

Size: depth when viewed from the light incidence surface side was 190 mm, width 252 mm; thickness of light incidence surface side end portion was 3.0 mm, with thickness of end surface portion being 0.2 mm.

Guide Plate C

Material: a transparent PMMA (polymethyl-methacrylate) body with a matted front face having an appropriate level of light-diffusion help increasing capability to emit light;

Size: depth when viewed from the light incidence surface side was 180 mm, width 135 mm; thickness of light incidence surface side end portion was 2.5 mm, with thickness of end surface portion being 0.5 mm.

As shown in these graphs, in each case the light rays have directivity, the brightness peak (main light-beam emission angle) in each case being: approximately 63 degrees in guide plate A, approximately 77 degrees in guide plate B and approximately 72 degrees in guide plate C. Generally speaking, the emission angle which gives brightness peak increases as the depth from the light incidence surface side increases.

According to a practical criteria, the sizes of the three guide plates A, B and C correspond respectively to small, large and medium. Thus the peak angles of approximately 63~77 degrees, represented here, can be regarded as covering a practical range of peak angles (main light-beam emission angle). FIG. 4 is a diagram to explain the basic action of the conventional prism sheet 4 which is generally used, presupposing such directional emission of the guide plate 1.

As shown in FIG. 4, the prism sheet 4 is provided along the front surface 5 of the guide plate 1 with the prism surface facing the inner side. The top angle of each prism element forming the prism element rows is, for instance, $\phi a + \phi b =$ approximately 60 degrees.

Now, when guide plate A is used, when light is supplied from the direction represented by arrow L1, the priority propagation direction of light rays emitted from the front surface 5 was therefore $\theta 2 =$ approximately 63 degrees. Considering that the refractive index of the guide plate A is around 1.5, the incidence angle to a front surface 5 results in $\theta 2 =$ being around 63° and $\theta 1$ being=around 35 degrees. Hereinafter, in this specification, a ray corresponding to such a priority propagation direction will be referred to as "main ray". Here, the main ray is represented by reference numeral S1.

The main ray S1 emitted from the front surface 5 passes directly through the vacant layer AR (refractive index $n0 =$ approximately 1.0) and thereafter enters the slope 4a of the prism sheet 4 at an angle which is almost perpendicular thereto ($\phi a =$ around 30 degrees). The proportion of the main ray entering the other slope 4b is extremely low.

Next, the main ray S1 straightly led to the slope 4b by which the main ray S1 is regularly reflected. The regularly reflected main ray S1 travels in a direction which is almost perpendicular to the flat face 4c of the prism sheet 4, and is emitted from the prism sheet 4. By this process, the propagation direction of the main ray S1 is altered to a substantially frontal direction.

However, the conventional surface light source device using a prism sheet in such an aspect had the following two problems.

(1) Problem 1: The slope 4a on the main ray incidence surface side of the prism element (the slope facing the incidence surface 2 side) makes almost no contribution to producing illuminating light in the frontal direction. This signifies that there has been no technological consideration of how to use the slope 4a to contribute to producing illuminating light in the frontal direction, despite the fact that there is scope for improving the uniformity of brightness on the flat face (light emission surface) 4c.

(2) Problem 2: As shown in FIG. 1, when flat-faced elements, such as the polarization separating sheet LS, are provided in layers on the flat face 4c of the prism sheet 4, the vacant layer (generally, a layer of a different refractive index), which is provided between these elements and the flat face 4c of the prism sheet 4, is liable to become extremely thin and unstable, causing sticking between the contacting faces.

Consequently, unless the interval is maintained by using a wider space, bright and dark patterns, coloring and the likes are liable to occur as a result of interference or moares. However, maintaining such an interval is incompatible with recent strong demand for thin construction.

OBJECT AND SUMMARY OF THE INVENTION

Accordingly, it is an object of the present invention to improve the above conventional surface light source device of side light type, by enabling each of a pair of slopes, which form the prism elements on the inner face of the prism sheet, to actively contribute to producing illuminating light to the frontal direction. At the same time, it is another object of the present invention to provide an improved surface light source device in which there is no sticking, nor any visible deterioration such as bright and dark patterns or coloring, even when elements having a flat face, such as a polarization separating sheet, are provided close together. Then, through these improvements, the present invention aims to provide a surface light source device with excellent brightness and visibility.

Then, by using a surface light source device improved in the above manner for backlighting of a liquid crystal panel, the present invention aims to provide a liquid crystal display having improved brightness and visibility. Furthermore, the present invention aims to provide an asymmetric prism sheet, having new characteristics, which can be applied in the above surface light source device or the liquid crystal display.

The present invention solves the problems described above by (1) incorporating asymmetry based on a new concept to the profile (cross-sectional shape) of a prismatic inner face of a prism surface, provided on the front surface of a directional emission guide plate, enabling illuminating light to be produced in a substantially frontal direction as a result of internal reflection from an slope on a main ray incidence side; (2) preventing the outer surface of the prism sheet from contacting another element (polarization separating sheet or the like) in a state such that interference or moare fringes are liable to occur; (3) thereby increasing diversity of the process of creating illuminating light.

The present invention is applicable to a surface light source device comprising a directional emission guide plate, a primary light source for supplying light toward a light incidence surface located at a side end portion of the guide plate, and a prism sheet provided along a front surface of the guide plate; or alternatively to a liquid crystal display using such a surface light source device as backlighting.

In each aspect of the present invention, each of a great number of prism elements, which provide a prismatic inner face of an asymmetric prism sheet provided on the front surface of the guide plate, comprises a first slope, facing the light incidence surface side of the guide plate, and a second slope, facing the opposite side, these slopes being repeated in alternation. Then, the inclination of the first slope and the inclination of the second slope are characterized in that they have the following two functions (routes contributing to creation of illuminating light in a substantially frontal direction).

(1) A main ray emitted from the guide plate is led inside the asymmetric prism sheet through the first slope, and then deflected to a substantially frontal direction by internal reflection by the second slope.

(2) A secondary ray, included in a bundle of light rays (hereinafter "secondary ray bundle") distributed at an angle around the main ray, having a larger emission angle than the main ray, is led inside the asymmetric prism sheet through the first slope, internally reflected from the second slope, and then deflected to a substantially frontal direction by further internal reflection from the first slope.

As explained in detail below, a practical value for a first slope angle $\phi a$ satisfying these conditions is extremely small (almost vertical), for instance, less than 10 degrees. The slope angle $\phi b$ of the second slope does not have to be so small.

Regarding the outer face of the asymmetric prism sheet, measures such as the following have been devised (measures may be employed jointly):

(2) The outer face of the asymmetric prism sheet itself provides an uneven surface. The uneven face may be a non-glare-processed face, a prism surface or a lens surface.

When the outer face comprises a prism surface, a great number of prism element rows are provided substantially perpendicular to the incidence surface of the guide plate. In this case, the asymmetric prism sheet becomes what is known as a double-faced prism sheet. When the outer face comprises a lens surface, a great number of lens element rows are provided substantially perpendicular to the incidence surface of the guide plate. In this case, the asymmetric prism sheet can be termed a "prism lens sheet".

In either case, interference streaks and moare streaks (undesirable brightness variations, visible deterioration) are prevented by interaction with elements, such as the polarization separating sheet, provided adjacent to the outer side of the asymmetric prism sheet.

Furthermore, from another point of view, internally reflected light, created through the routes above, relaxes the characteristic of straight emission in the frontal direction from the outer face asymmetric prism sheet. That is, a non-glare-processed face has a light-dispersing action, and a prism surface or lens surface providing an action of returning part of the internally reflected light, created through the routes above, to the guide plate (hereinafter "returning actions"). These actions are effective in improving uniformity and visibility of brightness of a surface light source device and a liquid crystal display.

(2) A separate additional element is provided to the outer side of the asymmetric prism sheet. An additional prism sheet, an additional lens sheet, a sheet having at least one surface forming a location face, and the like, can be used as this additional element.

When an additional prism sheet is used, the inner face is non-glare-processed and a great number of prism element rows are arranged on the outer face substantially perpendicular to the incidence face of the guide plate.

When an additional lens sheet is used, the inner face is non-glare-processed and a great number of lens element rows are arranged on the outer face substantially perpendicular to the incidence face of the guide plate.

In either case, the additional elements are put on the outer side of the asymmetric prism sheet, whereby interference streaks and moare streaks (undesirable brightness variations, visible deterioration) are prevented by interaction between opposing faces of the elements.

Furthermore, from another point of view, even when the internally reflected light, created through the two types of routes described above, is emitted straight from the outer face of the asymmetric prism sheet in a substantially frontal direction, since the light subsequently receives the light-dispersing action and the returning action, uniformity and visibility of brightness of a surface light source device and a liquid crystal display can effectively be improved.

When the present invention is applied in a liquid crystal display, a surface light source device having the above characteristics need only be employed in a known manner as backlighting of a liquid crystal panel. In that case, the above characteristics are, of course, realized in the display qualities (brightness, brightness uniformity, visibility and the like) of the liquid crystal display. In compliance with a typical liquid crystal display, backlighting light produced by a surface light source device the above characteristics illuminates the liquid crystal panel via a polarization separating sheet.

A prism sheet having a prism face, comprising a great number of asymmetric prism element rows, and an uneven face is proposed as an asymmetric prism sheet, the asymmetric prism element rows comprising alternate repetitions of a first slope and a second slope facing the opposite direction to the first slope as to satisfy the conditions below.

In other words, according to the present invention, the inclination of the first slope and the inclination of the second slope; (1) have values which ensure that a first ray is led into the asymmetric prism sheet from the first slope and deflected to a substantially frontal direction by internal reflection from the second slope, and in addition, a secondary ray is led into the asymmetric prism sheet from the first slope, internally reflected from the second slope, further internally reflected from the first slope and deflected to a substantially frontal direction; and moreover (2) entry angles of the first ray and the second ray to the asymmetric prism sheet are both positive (where positive denotes entry angles of rays approaching from the tip side of the prism elements).

Practical values of slope angles $\phi a$ and $\phi b$ to satisfy these conditions are: $\phi a$ =less than 10 degrees, $\phi b$=within the range 30 degrees~40 degrees.

The uneven face may comprise a non-glare-processed face, a prism surface or a lens surface. In the case of a prism surface, a great number of prism element rows are provided in a direction substantially at a right angle to the arrangement direction of the asymmetric prism element rows. Furthermore, in the case of a lens surface, a great number of lens element rows are provided in a direction substantially at a right angle to the arrangement direction of the asymmetric prism element rows.

Moreover, by treating the polarization separating sheet itself as an element having an uneven face, the polarization separating sheet may be optically joined to the outer face of the asymmetric prism sheet, making it possible to provide the device in a single body.

DESCRIPTION OF THE PREFERRED EMBODIMENTS

Figure 4:
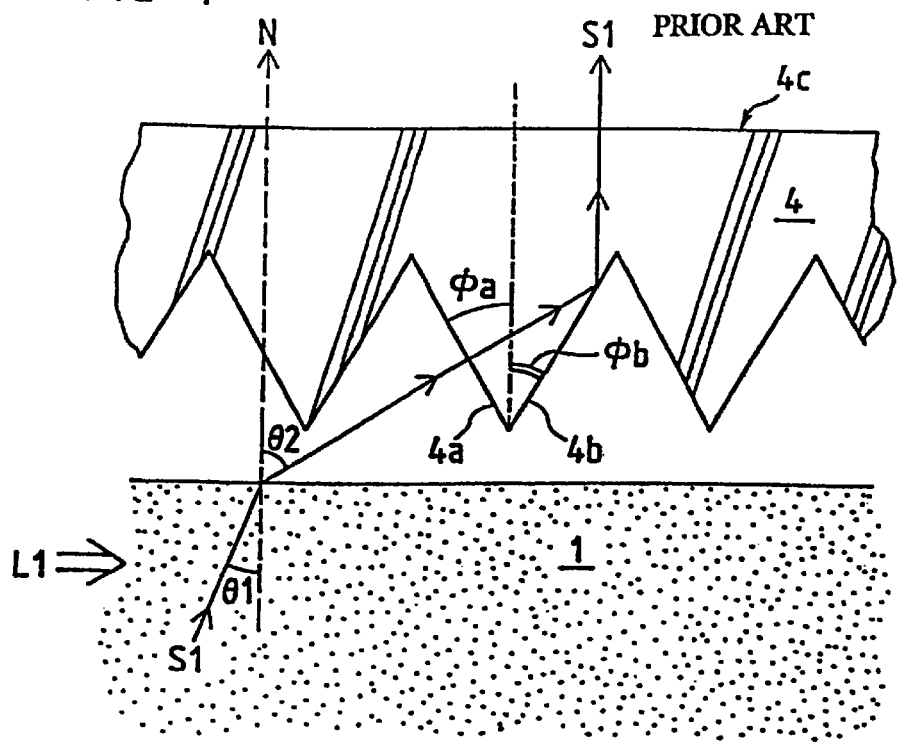
FIG. 4 is a diagram to explain the basic action of a conventional prism sheet 4 in general use.

There will be detailed below several preferred embodiments of the present invention. The drawings explaining the constitutions of principal parts of the embodiments are depicted in similar partial cutaway perspective to FIG. 4 (the conventional constitution). In these drawings, thickness of prism sheet and other elements, pitch and depth of the prism elements rows and the like are exaggerated for diagrammatic convenience.

Figure 6:
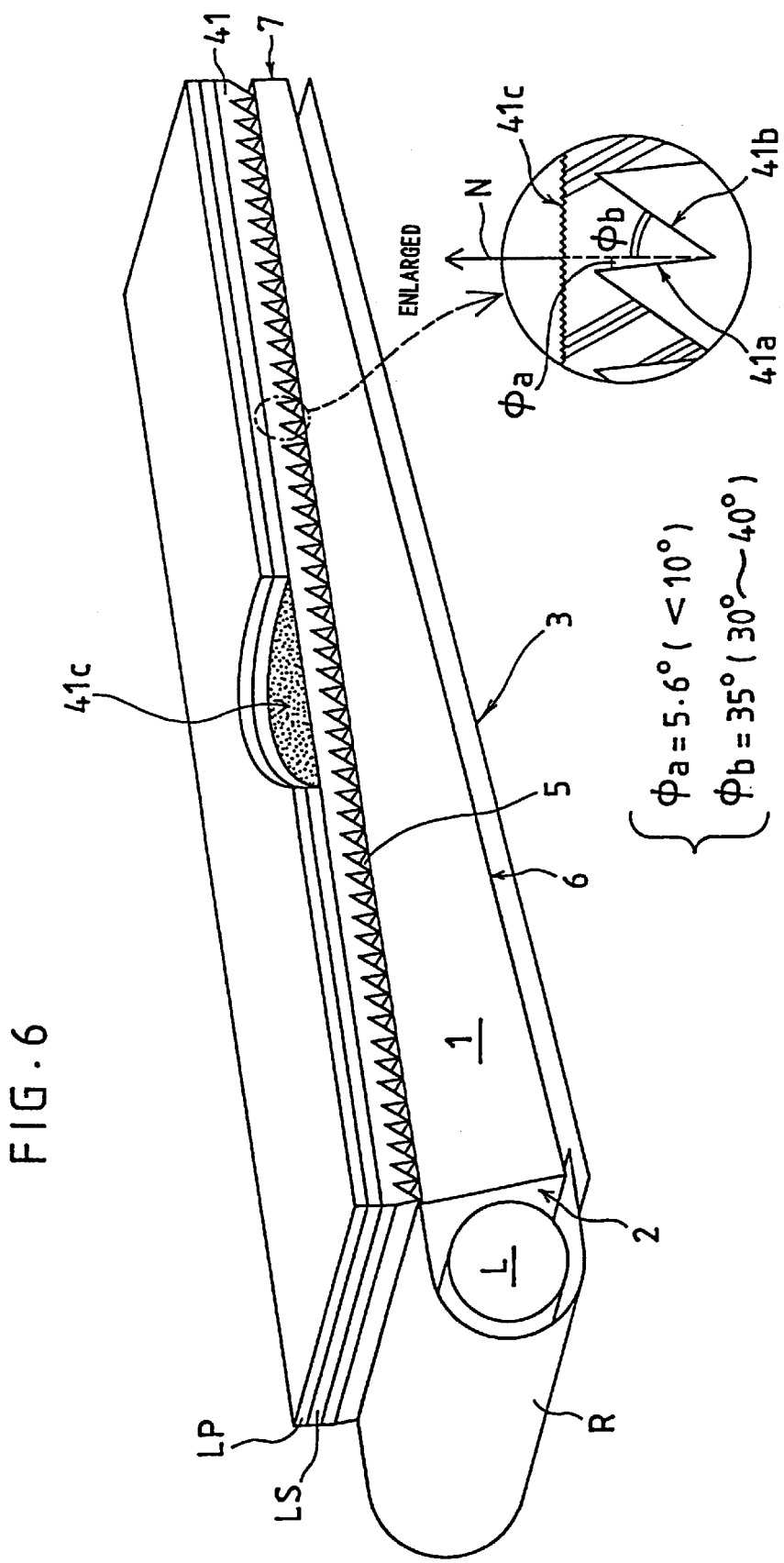
FIG. 6 is a partial cutaway perspective showing a constitution of principal parts of a first embodiment of the present invention.

FIG. 6 is a partial cutaway perspective showing the constitution of principal parts of a first embodiment of the present invention. This embodiment has the same constitution as the conventional liquid crystal display shown in FIG. 1, except that the prism sheet provided along the front surface (light emission surface) 5 of the guide plate 1 is replaced by an asymmetric prism sheet 41, according to features of the present invention. The asymmetric prism sheet 41 has two features (1) and (2). Feature (1) is common to asymmetric prism sheets of the present invention; feature (2) is an example of uneven face which is opposite to the asymmetric prism face.

(1) An asymmetric prism sheet 41, according to features of the present invention, is used as the prism sheet provided along the front surface (light emission surface) 5 of the guide plate 1. As shown in the partial enlarged sectional view, the slope angles of a pair of slopes 41a and 41b, which form each prism element row of the asymmetric prism sheet 41, are such that slope angle φa of the first slope 41a, which faces the light incidence surface 2 side of the guide plate 1, is 5.6 degrees; slope angle φb of the second slope 41b is 35 degrees. The method for determining these slope angles φa and φb will be explained in more detail later.

(2) The surface of the outer face 41c of the asymmetric prism sheet 41 is a non-glare-processed face (location face). This is a feature of the first embodiment of the asymmetric prism sheet 41.

Figure 1:
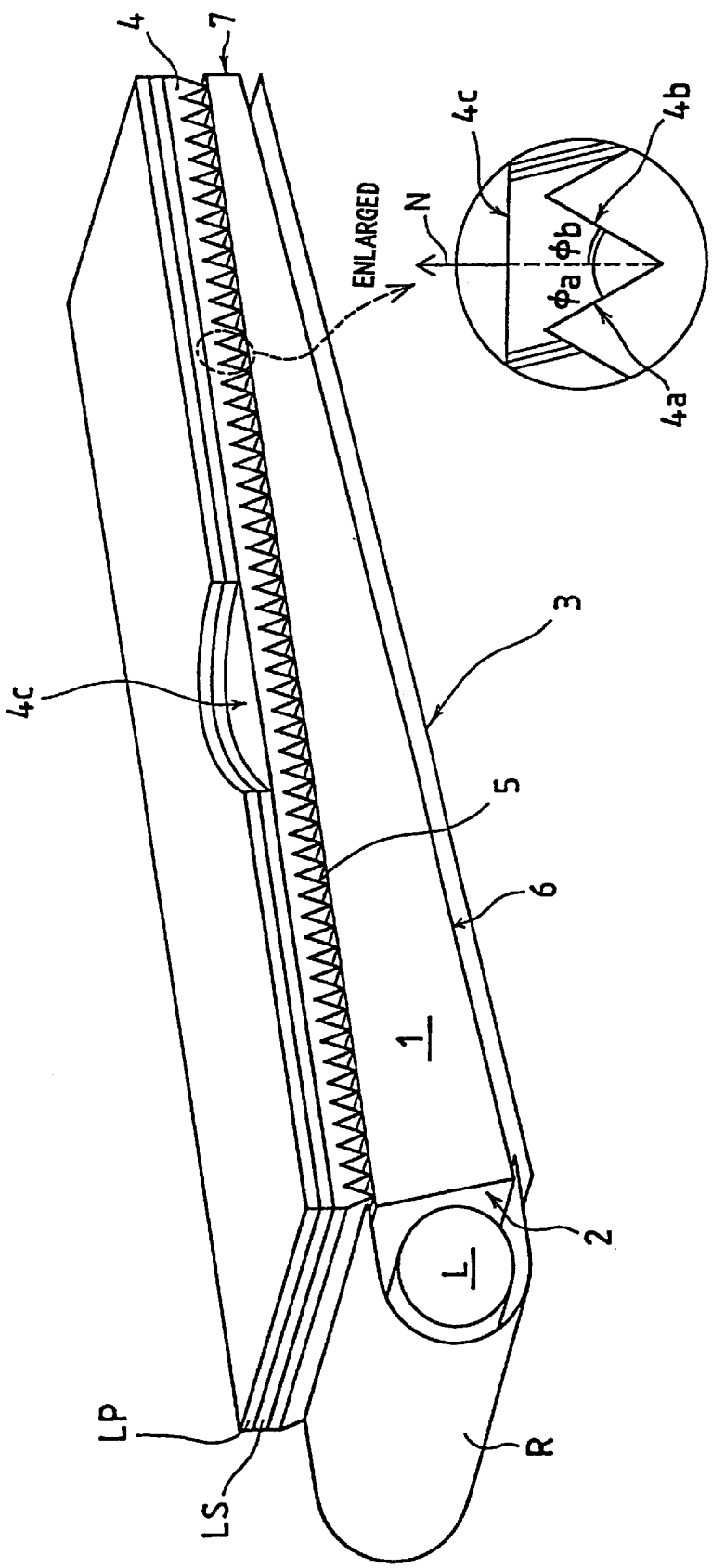
FIG. 1 is a partial cutaway perspective showing a diagrammatic constitution of a liquid crystal display which uses as backlighting a surface light source device of side light type, using a conventional prism sheet.

Apart from these differences, the constitution and arrangement of elements is the same as the conventional surface light source device of side light type of FIG. 1.

That is, a directional emission guide plate 1 comprises an optical member, which is wedge-shaped in cross-section, having a light-scattering guide body or a light-permeable guide body. The scattering guide body comprises a matrix of, for instance, polymethyl-methacrylate (PMMA) and a "substance of different refractive index" which is mixed and dispersed uniformly within the matrix.

The end face of the thick side of the guide plate 1 constitutes a light incidence surface 2, and a fluorescent lamp (cold cathode tube) L backed by a reflector R is provided near the incidence surface 2 as a primary light source element. Of course, a hot cathode tube may alternatively be used as the primary light source element. A reflector 3, comprising a frontal reflection silver-foil sheet or a diffused reflection white sheet, is provided along the under face 6 of the guide plate 1.

A polarization separating sheet LS is provided on the outer face of the asymmetric prism sheet 41, which is provided along the front surface (emission surface) 5 of the guide plate 1, and a liquid crystal panel LP is provided on the outer face of the polarization separating sheet LS. On the inner face of the asymmetric prism sheet 41, a great number of asymmetric prism sheet element rows are arranged substantially parallel to the light incidence surface 2 of the guide plate 1. Each row of prism elements has first slope 41a and a second slope 41b which together form a V-shaped groove. As described above, slope angle φa is 5.6 degrees, slope angle φb is 35 degrees.

Light, sent from the light source element L into the guide plate 1 is subject to scattering and reflection action within the guide plate 1 while being guided toward the end surface 7 of the thin side of the guide plate 1. By this process, illuminating light is gradually emitted from the front surface 5. As explained in connection with FIG. 2 and FIG. 3, light rays emitted from the front surface 5 of the guide plate 1 have directivity.

For instance, when the abovementioned guide plate A is used as the guide plate 1, light rays with directivity, peaking in the direction approximately 63 degrees from the frontal direction, are emitted. That is, the main ray is an emitted ray traveling in a direction of approximately 63 degrees. Similarly, when guide plate B is used as the guide plate 1, the main ray travels in a direction of approximately 77 degrees, and when guide plate C is used, the main ray travels in a direction of approximately 72 degrees.

Illuminated rays of light having directivity, emitted from the front surface 5 of the guide plate 1, receive the action of the asymmetric prism sheet 41 and are then polarization-separated by the polarization separating sheet LS and illuminates the liquid crystal panel LP from its back. Below, the action of the asymmetric prism sheet 41 and the method of determining the slope angles φa and φb and other matters will be explained with addition reference to FIG. 7~FIG. 13. Description centers on a case in which the guide plate A is used as the guide plate 1.

Figure 7:
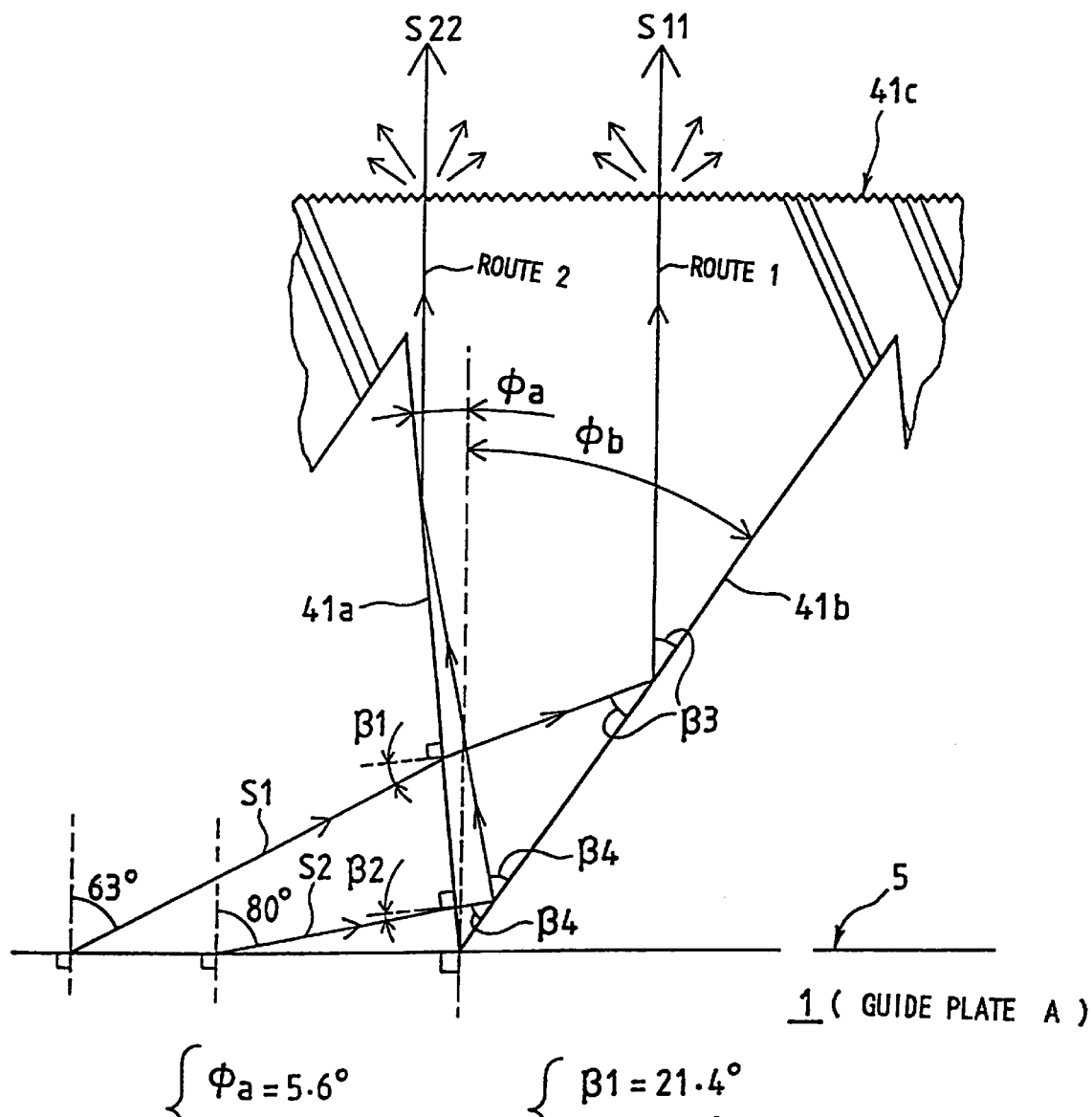
FIG. 7 is a diagram to explain effects of an asymmetric prism sheet and a method for determining slope angles $\phi a$ and $\phi b$ and others for the present invention.

As shown in FIG. 7, a great number of asymmetric prism elements (only one is depicted), wherein slope angle φa=5.6 degrees and slope angle φb=35 degrees, are provided on the inner face of the asymmetric prism sheet 41 of the present example. The asymmetric prism sheet 41 is formed from polymethyl-methacrylate (PMMA) with a refractive index n of approximately 1.5.

Figure 2:
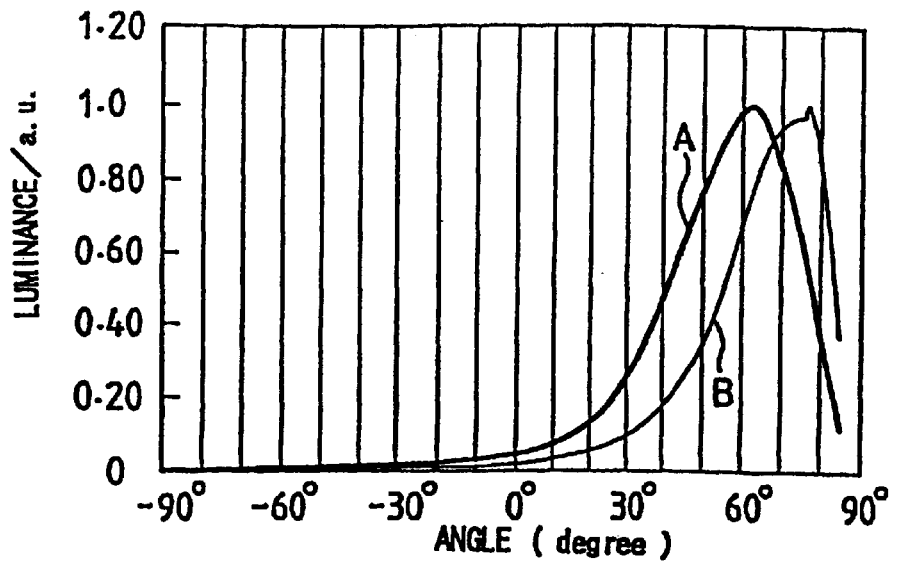
FIG. 2 is a graph illustrating emission characteristics of a guide plate A and a guide plate B.

As clearly shown in the graph of FIG. 2, the main ray S1 emitted from the guide plate 1 (guide plate A) propagates to a direction of 63 degrees and enters the first slope 41a. The incidence angle β1 now is 21.4 degrees. This incidence angle diverges considerably from 0 degrees (perpendicular incidence) but reflection rate is almost the same as at perpendicular incidence.

Figure 5:
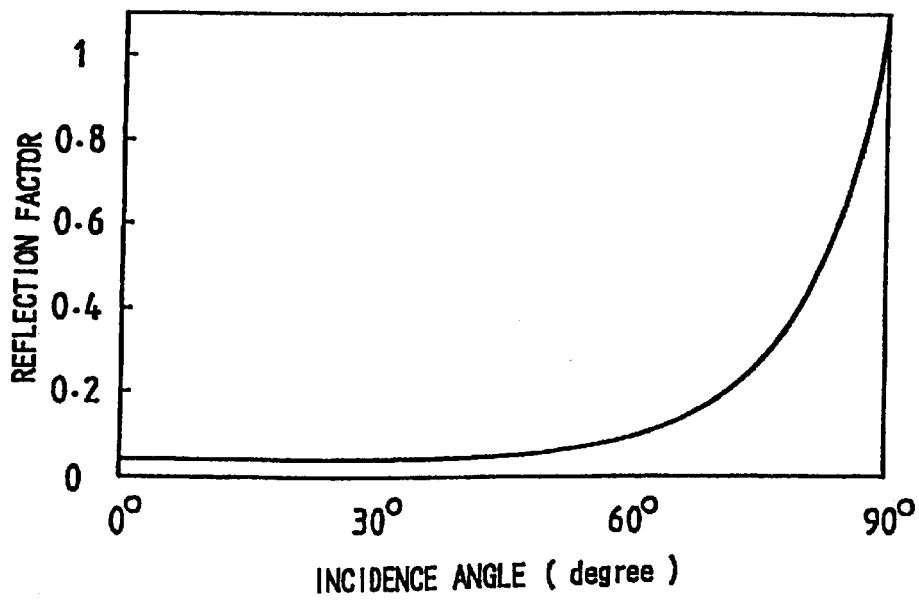
FIG. 5 is a graph illustrating reflection rate of visible light by a dielectric having a refractive index of 1.5 as a function of the incidence angle (horizontal axis)

FIG. 5 is a graph to explain this, and illustrates a reflection rate of visible light illuminated onto a dielectric as a function of the incidence angle (horizontal axis). As shown in this graph, within an incidence angle range of 0 degrees to 45 degrees, most of the light passes through the boundary face (first slope 41a) and proceeds into the asymmetric prism sheet 41.

Having entered the asymmetric prism sheet 41, the main ray S1 is slightly refracted before being regularly reflected off the second slope 41b, deflected to the frontal direction and emitted from the non-glare-processed face outer face 41c (see S11). At this time, an appropriate proportion of the light is diffused, controlling straight emission from the outer face 41c of the asymmetric prism sheet 41.

However, as clearly shown in the graph of FIG. 2, the light rays emitted from the front surface 5 of the guide plate 1 are spread to a certain extent around the main ray S1. This spread can be regarded as "a bundle of secondary light rays distributed at an angle around the main ray". This "bundle of secondary light rays" can be divided into "a bundle of secondary light rays at a larger emission angle than the main ray" and "a bundle of secondary light rays at a smaller emission angle than the main ray". Hereinafter, a light ray belonging to the former category will be referred to as "inner secondary ray" and a light ray belonging to the latter category will be referred to as "outer secondary ray".

Now, as shown in FIG. 7, when the light ray is tracked, it can be discovered that secondary ray S2, one of the inner secondary rays which is emitted at an angle of 80 degrees, enters the first slope 41a at an incidence angle β2=4.4 degrees (substantially perpendicular). As shown in the graph of FIG. 5, most of the components of the secondary ray S2 pass through the boundary face (slope 41a) and continue into the asymmetric prism sheet 41.

Having entered the asymmetric prism sheet 41, the secondary ray S2 is slightly refracted before being regularly reflected off the second slope 41b. Here, when angle β4 of the regularly reflected light of the secondary ray S2 to the slope 41b is considered, it is understood that β4 is greater than angle β3 made by the main ray S1 on the same slope 41b. Therefore, after being regularly reflected off the slope 41b, the secondary ray S2 travels once again toward the slope 41a.

The propagation direction at this moment does not diverge greatly from the frontal direction; as can be understood from FIG. 7, the propagation direction diverges from the frontal direction (see the route of main ray S1 toward the outer face 41c) toward the slope 41a side by only a small angle. This signifies that it is possible to deflect the inner secondary ray S2 to the frontal direction by selecting an appropriate small angle for the slope angle φa of the slope 41a.

The slope angle conditions in FIG. 7, in which φa=5.6 degrees and φb=35 degrees, constitute one example of a solution for (φa and φb) which simultaneously realizes deflection of the main ray S1 to the frontal direction and deflection of the secondary ray S2 to the frontal direction under given conditions (main ray emitted in a direction of 63 degrees; refractive index of prism sheet=approximately 1.5). After being regularly reflected and deflected from the slope 41a, an appropriate proportion of the secondary ray S2 is diffused, as was the case with main ray S1, and emitted from the outer face of the asymmetric prism sheet 41 (see S22). Thus, straight frontal direction emission of the secondary ray S2 can be controlled.

Figure 8:
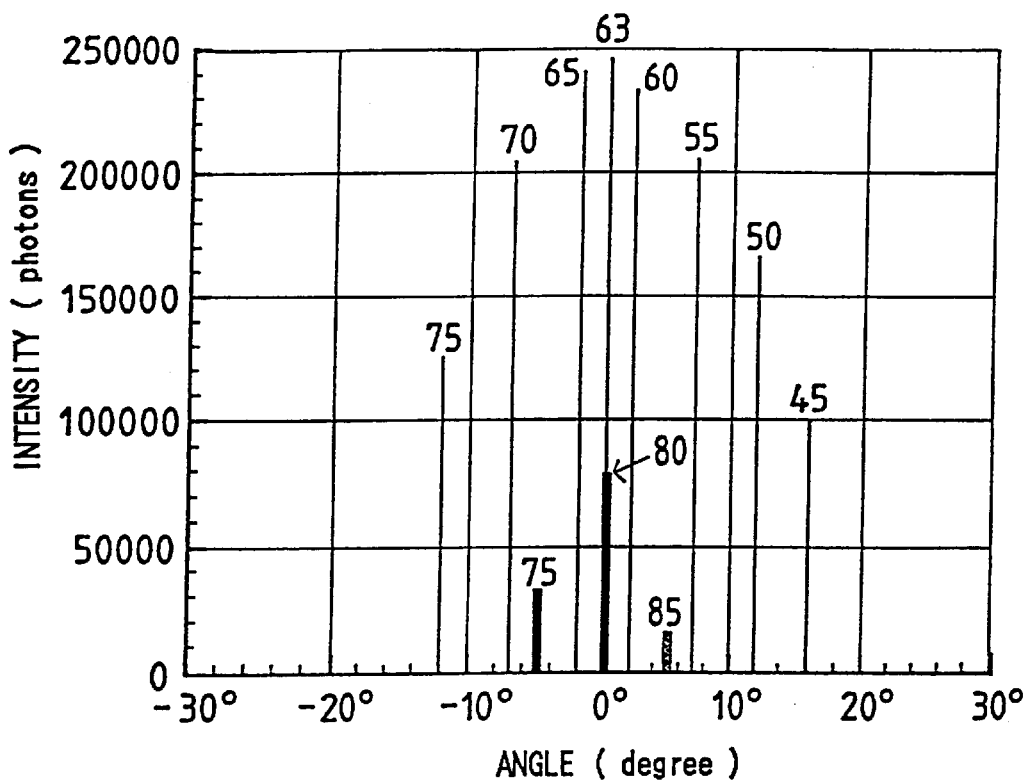
FIG. 8 is a line graph constructed from results obtained when angle characteristics for guide plate A, shown in the graph (emission characteristics at different angles) of FIG. 2, were digitized in increments of 0.1 degrees and light ray tracking simulation was carried out for each direction component for the asymmetric prism sheet 41 shown in FIG. 7.

FIG. 8 is a graph constructed from results obtained when angle characteristics for guide plate A, shown in the graph (emission characteristics at different angles) of FIG. 2, were digitized in increments of 0.1 degrees and light ray tracking simulation was carried out for each direction component under employment of the asymmetric prism sheet 41 shown in FIG. 7. In the graph, the line indicators illustrate results calculated for emission angle from guide plate A, selected at increments of 5 degrees.

The horizontal axis represents angle after light has been emitted from the outer face 41c, by way of regular reflection (deflection) from the slope 41a or the slope 41b; 0 degrees represents the frontal direction, negative values represent angles shifted toward the incidence surface 2 side, and positive values represent angles shifted toward the end side 7 of the guide plate. The vertical axis represents light intensity measured in number of photons, the number of photons of main ray S1 before entering the prism sheet being specified as 250000. The numbers above each line indicator represent emission angles from the guide plate A.

For instance, the line indicator with number 63 indicates that main ray S1, emitted from the guide plate A at an emission angle of 63 degrees and deflected to the frontal direction (0 degrees), has intensity (number of photons) of 250000. Furthermore, the line indicator with number 70 indicates that an inner secondary ray, emitted from the guide plate A at an emission angle of 70 degrees and deflected to a direction of −7 degrees, has intensity (number of photons) of around 215000. Similarly, the line indicator with number 55 indicates that an outer secondary ray, emitted from the guide plate A at an emission angle of 55 degrees and deflected to a direction of +7 degrees, has intensity (number of photons) of around 215000.

The following is understood from the graph in FIG. 8.

(1) The line indicator (emission at 63 degrees) for the main ray S1 and the line indicator (emission at 80 degrees) for the inner secondary ray S2 overlap at 0 degrees, representing the frontal direction. In other words, the peak of the main ray S1 in the frontal direction is reinforced by the secondary ray S2. Expressed in numbers of photons, 250000 is reinforced approximately as follows: 250000+80000 =330000.

(2) Deviation from the frontal direction increases as the emission angle shifts inward from 63 degrees of the main ray S1 to 65 degrees and 70 degrees, or outward to 60 degrees, 55 degrees, 50 degrees and 45 degrees. This can be interpreted as indicating regular reflection at the slope 41b.

(3) However, two line indicators are shown at emission angles of 75 degrees, one with large deviation (approximately −12 degrees) from the frontal direction, the other with small deviation (approximately −5 degrees). This represents the critical state (influenced by quantum angle width in digitizing) where photons which have been regularly reflected from the slope 41b subsequently are regularly reflected again by the slope 41a and, at the same time, are emitted without returning to the slope 41a.

(4) There is no line indicator corresponding to light regularly reflected from the slope 41a among the outer side secondary rays (60 degrees, 55 degrees, 50 degrees and 45 degrees).

(5) Regular reflection from the slope 41b occurs, not only in the case of the secondary ray at 80 degrees, but also with the secondary rays (75 degrees and 85 degrees) which surround it. However, these other secondary rays deviate slightly from the frontal direction.

Figure 9:
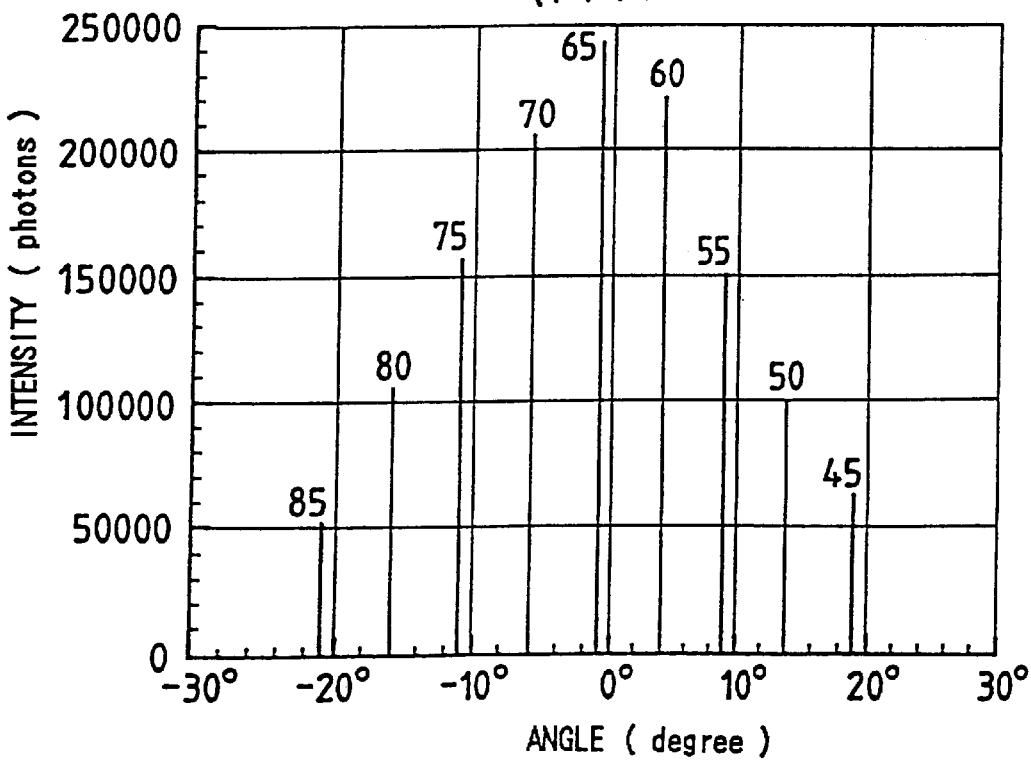
FIG. 9 is a graph constructed from results obtained by performing calculation in the same manner as FIG. 8 using a conventional symmetric prism sheet.

Such effects are not expected for conventional symmetric prism sheets. FIG. 9 is a graph showing results of a simulation to illustrate this fact, in which measurements were obtained under the same conditions as the graph of FIG. 8, except that a symmetric prism sheet, where φa=φb=31 degrees, was used. Here too, the number of photons of main ray S1 before entering the prism sheet was specified as 250000. However, line indicator for the main ray S1 (emission at 63 degrees) is not shown here.

The following is understood from the graph in FIG. 9.

(1) Deviation from the frontal direction increases as the emission angle shifts inward to 65 degrees and 85 degrees, or outward to 60 degrees, 55 degrees, 50 degrees and 45 degrees. This can be interpreted as indicating regular reflection at the slope 41b.

(2) That is, there is no line indicator corresponding to light among the outer side and inner side secondary rays which have been regularly reflected from the slope 41a.

Figure 12:
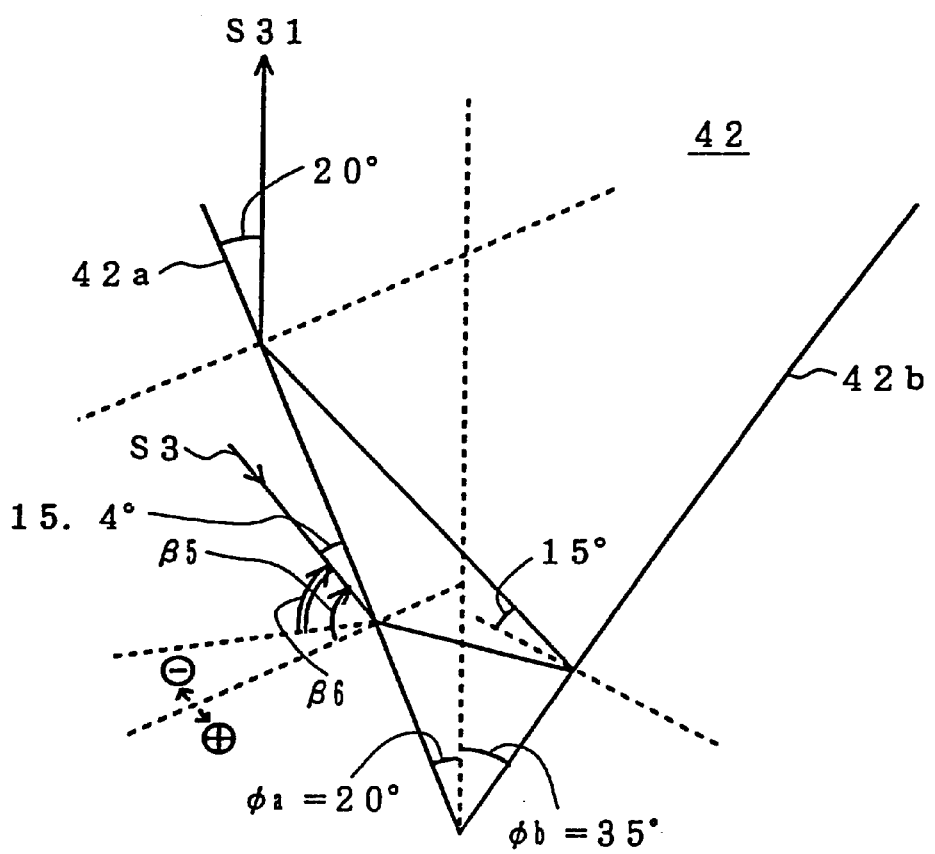
FIG. 12 is diagram explaining that deflection to the frontal direction from both slopes cannot be realized in an asymmetric prism sheet wherein $\phi a$=20 degrees, $\phi b$=35 degrees.

A known prism sheet has φa=20 and degrees φb=35 degrees, but the above frontal direction deflection effect using two routes (using both slopes) cannot be realized with such slope angle conditions. FIG. 12 illustrates this fact for a prism sheet 42 (refractive index 1.5) having φa=20 degrees and φb=35 degrees.

Now, suppose that a ray S31 is regularly reflected off slope 42a and deflected to the frontal direction. When the light path is depicted after taking into account reversivility principle, the light path shown is obtained. That is, incidence angle to the slope 42a is: β5=−75 degrees; the approach angle to the prism sheet is −55 degrees. Here, approach angle represents propagation direction of an incident ray with respect to general plane of the prism sheet as a reference (in other words, inclination angle of incident ray to general direction of the prism sheet). Both incidence angle and approach angle of a ray approaching from the prism element tip end side are provided with sign +.

As is clear from FIG. 12, rays entering at a negative angle, such as ray S3, cannot in practice be produced from rays emitted from the guide plate. In the prism sheet of the present invention, it is necessary that rays with positive approach angles can be deflected off the first slope to the frontal direction. In order to achieve this, the slope angle φa of the first slope has to be fairly small.

Of course, the critical value of the slope angle φa varies slightly according to refractive index of the prism sheet and emission angle of the ray, but in design there is no need to select the critical value.

By the same method as FIG. 12, with a prism sheet with refractive index 1.5 having a first slope of slope angle φa=15 degrees, supposed that a ray (emitted at an angle of 63 degrees) is regularly reflected off a second slope (slope angle φb) and deflected to the frontal direction, incidence angle corresponding to incidence angle β5 is −34.2 degrees, and approach angle to the prism sheet is −19.2 degrees.

Furthermore, with a prism sheet with refractive index 1.5 having a first slope of slope angle φa=10 degrees, and supposing that a ray (emitted at an angle of 63 degrees) is regularly reflected off a second slope (slope angle φb) and deflected to the frontal direction, incidence angle corresponding to incidence angle β5 is −13.2 degrees, and approach angle to the prism sheet is −3.2 degrees.

From these examples we can conjecture that, assuming that the prism sheet has refractive index of 1.5 and a ray is emitted at an angle of 63 degrees, the critical angle to satisfy conditions whereby the ray is regularly reflected off the second slope (slope angle φb) and deflected to the frontal direction, and in addition, a secondary ray is regularly reflected off the first slope (slope angle φa) and deflected to the frontal direction, is around φa=10 degrees.

Figure 10:
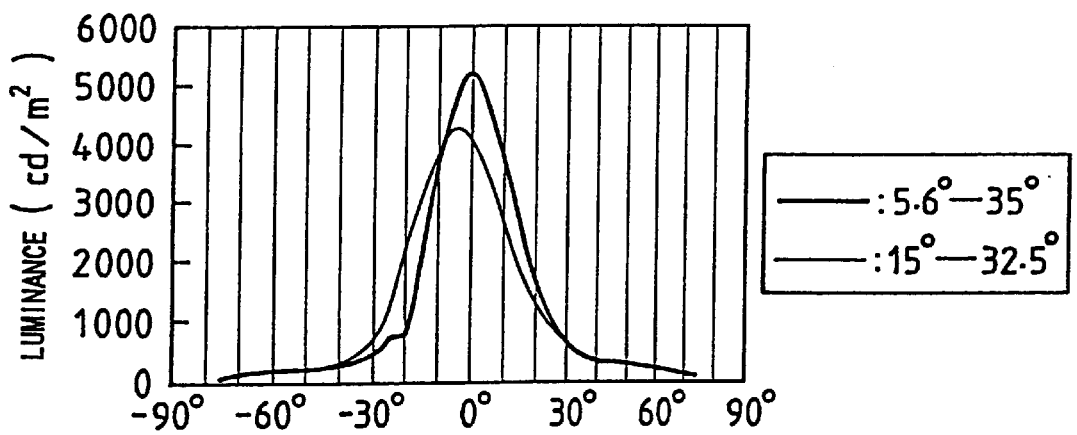
FIG. 10 is a graph showing results obtained for two types of asymmetric prism sheet ($\phi a$=5.6 degrees, $\phi b$=35 degrees; and $\phi a$=15 degrees, $\phi b$=32.5 degrees), both having refractive index of 1.5, when emission characteristics from the outer faces (not non-glare-processed) of the prism sheets were calculated.
Figure 11:
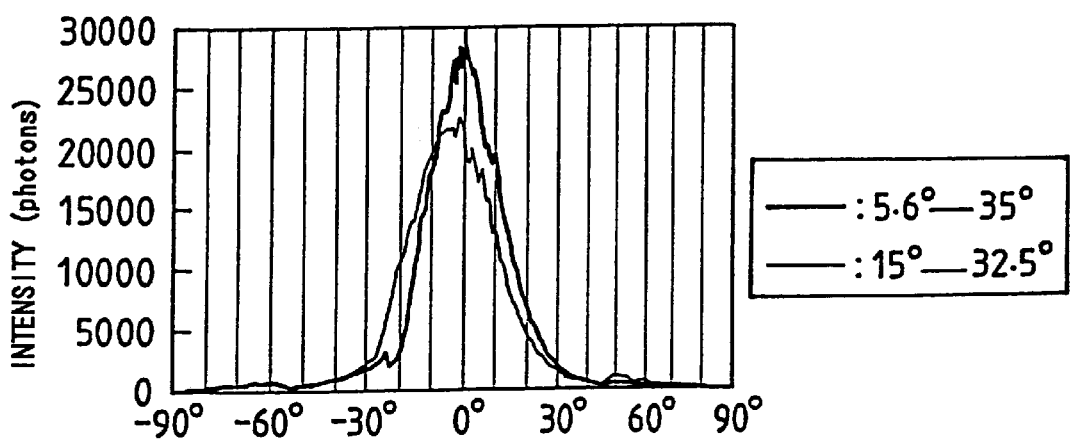
FIG. 11 is a graph showing results obtained from calculation for two types of asymmetric prism sheet ($\phi a$=5.6 degrees, $\phi b$=35 degrees; and $\phi a$=15 degrees, $\phi b$=32.5 degrees), both having refractive index of 1.5, when emission characteristics from the outer faces (not non-glare-processed) of the prism sheets were calculated.

FIG. 10 and FIG. 11 are graphs to support the above, illustrating measurements (FIG. 10) and calculations (FIG. 11) of emission characteristics from the outer faces (non-glare-processed) of two types of asymmetric prism sheets having refractive index of 1.5 (φa=5.6 degrees, φb=35 degrees ; and φa=15 degrees, φb =32.5 degrees).

The prism sheet having φa=5.6 degrees and φb=35 degrees is identical to that shown in FIG. 8; the prism sheet having φa=15 degrees and φb=32.5 degrees is between the prism sheet of FIG. 8 and the prism sheet of FIG. 12.

Figure 3:
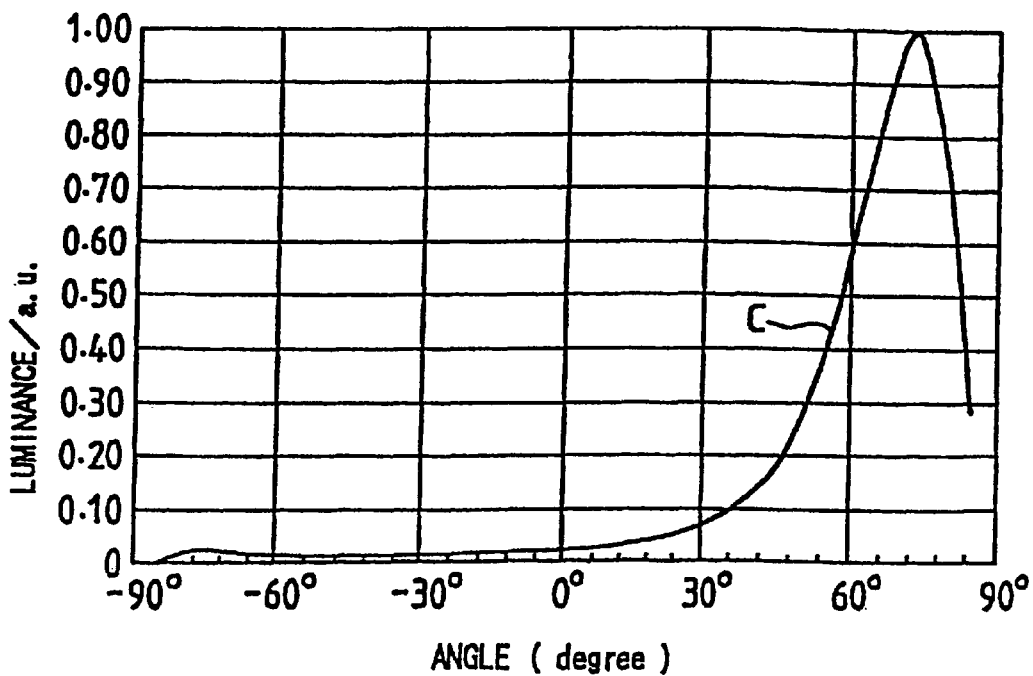
FIG. 3 is a graph illustrating emission characteristics of a guide plate C.

Measurement conditions were equivalent to the graphs of FIG. 2 and FIG. 3, calculation conditions were equivalent to the graphs of FIG. 8 and FIG. 9. The disorder of the lines in FIG. 11 is caused by digitizing (quantumizing) during calculation processing. As clearly shown in the graphs of FIG. 10 and FIG. 11, when φa=15 degrees, it is not possible to obtain the same brightness as was obtained when using the asymmetric prism sheet in which φa=5.6 degrees (brightness is reduced by roughly 20%). It is believed that this difference is largely a result of the action provided by the first slope (slope angle φa).

Regarding the actual design, it is not necessary to search for the critical condition for the slope angle φa of the first slope; a combination of both slope angles φa and φb need only be calculated on account of characteristics (main ray emission angle) of the guide plate and refractive index of the prism sheet. As clearly shown in the graphs of FIG. 2 and FIG. 3, the inner secondary ray is distributed with a certain amount of spread (around 15 degrees to 20 degrees) around the main ray.

Therefore, after provisionally fixing the slope angle φb at an appropriate value (30 degrees~40 degrees) and determining a value for the slope angle φa at which the main ray S1 will be deflected as much as possible to the frontal direction from the second slope having the above slope angle φb, it is necessary only to confirm that there can exist a secondary ray deflected to the frontal direction from the first slope with the above conditions.

In the examples shown in FIG. 8, when a guide plate giving an emission angle for the main ray S1 of 63 degrees was used in conjunction with a prism sheet comprising material having a refractive index of 1.5, the slope angle φb first is provisionally fixed at 35 degrees. By so doing, the slope angle φa must be 5.6 degrees in order to deflect the main ray S1 to the frontal direction from the second slope. Next, as explained in FIG. 12, when reversivility principle is applied under the above conditions (35 degrees and 5.6 degrees), it is confirmed that a secondary ray S2 is really deflected to the frontal direction from the first slope.

Next, it was investigated in three examples to what extent the slope angles φa and φb should be altered when refractive index n of the asymmetric prism sheet has been changed, and the following results were obtained. Here, emission angle of the main ray was 63 degrees.

Figure 13:
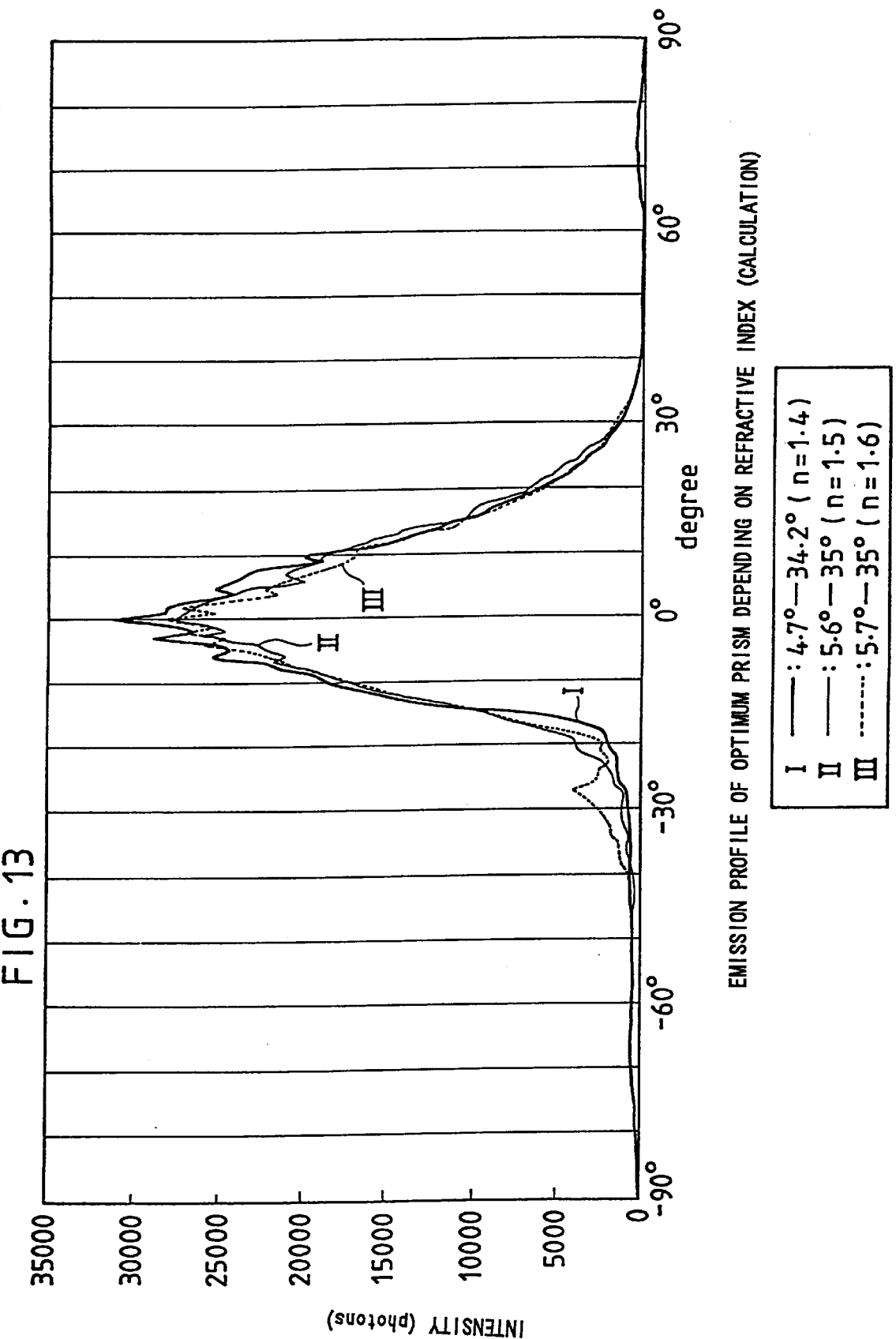
FIG. 13 is a graph showing results obtained when emission characteristics from the outer faces (not non-glare-processed) of prism sheets I~III were calculated under the same conditions as FIG. 11.

(1) n=1.4: φa=4.7 degrees, φb=34.2 degrees
(2) n=1.5: φa=5.6 degrees, φb=35 degrees
(3) n=1.6: φa=5.7 degrees, φb=35 degrees FIG. 13 shows measurements of emission characteristics from the outer faces (non-glare-processed) of three symmetric prism sheets I, II, and III, satisfying the above conditions, which were obtained under the same conditions as FIG. 11. The graph for prism sheet II is identical to the graph for the 5.6/35 prism sheet in FIG. 11. As shown by these examples, even when refractive index of the prism sheets is varied within a realistic range, the change in the conditions for the optimum slope angle in each case is slight (difference of 1 degree for a 0.2 change in refractive index), and there is no great difference in characteristics obtained.

The explanation above has been developed about constitution, effect and others of asymmetric prism sheets of the present invention and surface light source devices using the same as an example of first embodiment applied to liquid crystal display. The explanation below summarizes the constitution and action of other embodiments. The following explanation will center as much as possible on the points of difference with the first embodiment, omitting repetition of points already described. Particularly, the shape and action of the inner face (asymmetric prism face) of the asymmetric prism sheets 42 and 43 is the same as already explained in detail in the first embodiment.

Figure 14:
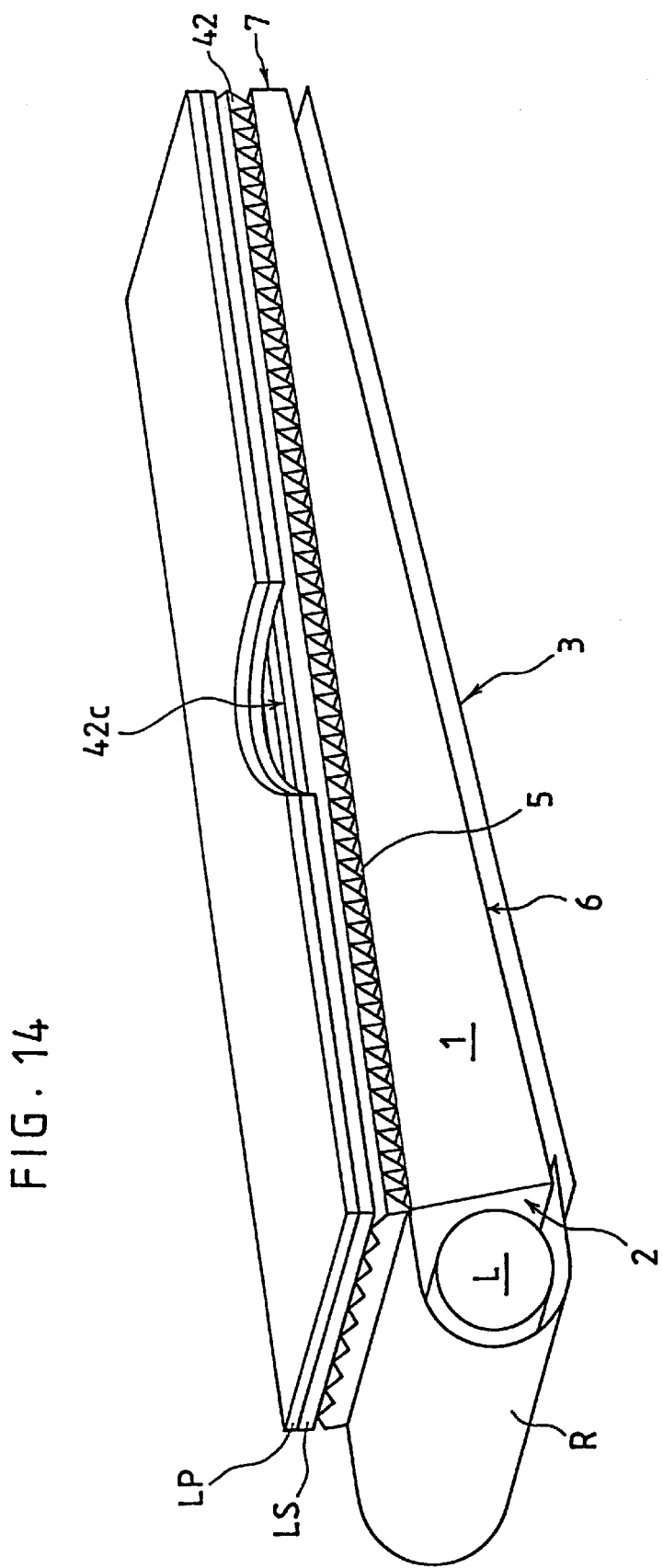
FIG. 14 is a partial cutaway perspective illustrating principal parts of a constitution of a second embodiment of the present invention.

FIG. 14 is a partial cutaway perspective illustrating principal parts of a constitution of a second embodiment of the present invention. The present embodiment has the same constitution as the first embodiment of FIG. 6, the only practical difference between the two being the outer face of the asymmetric prism sheet.

That is, in the present embodiment, an asymmetric prism sheet 42, having a great number of prism elements provided on both faces thereof, is used instead of the asymmetric prism sheet 41. The prism element rows provided on the outer face 42c of the asymmetric prism sheet 42 are substantially orthogonal to the prism element rows provided on the inner face. Furthermore, each prism element row is symmetric or asymmetric, and the prism top angle is 40 degrees~less than 180 degrees, more preferably around 55 degrees 160 degrees.

Figure 20:
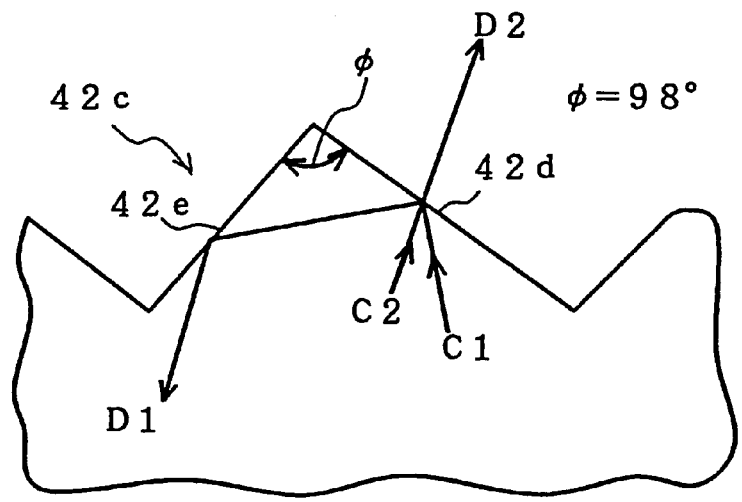
FIG. 20 is a diagram explaining an example of an embodiment of an outer face (prism surface) of an asymmetric prism sheet or an additional prism sheet, and the action thereof.

FIG. 20 is a diagram to explain the action of the prismatic outer face 42c, showing a cross-sectional view taken along a surface parallel to the light incidence surface 2 of the guide plate 1. Ray C1 represents light traveling to the frontal direction within a surface parallel to the light incidence surface 2, and ray C2 represents light traveling in a direction deviated from the frontal direction within a surface parallel to the light incidence surface 2. Prism top angle φ is depicted as 98 degrees. Behaviour of rays C1 and C2 is characterized as follows.

C1: Since many components are internally reflected off the slopes in the sequence 42d, 42e, or in the sequence 42e, 42d, and shifted within a surface parallel to the light incidence surface 2, producing a ray D1 returning toward the inner face, the overall path history of the illuminating light is diversified.

C2 : Most components are emitted from the slope, but refraction effect of refractive index of the slope causes these to be gathered to the frontal direction within a surface parallel to the light incidence surface 2.

Eventually as a whole, the outer face 42c of the asymmetric prism sheet 42 gives variation to paths of the illuminating light while gently gathering light to the frontal direction within a surface parallel to the light incidence surface 2.

Figure 15:
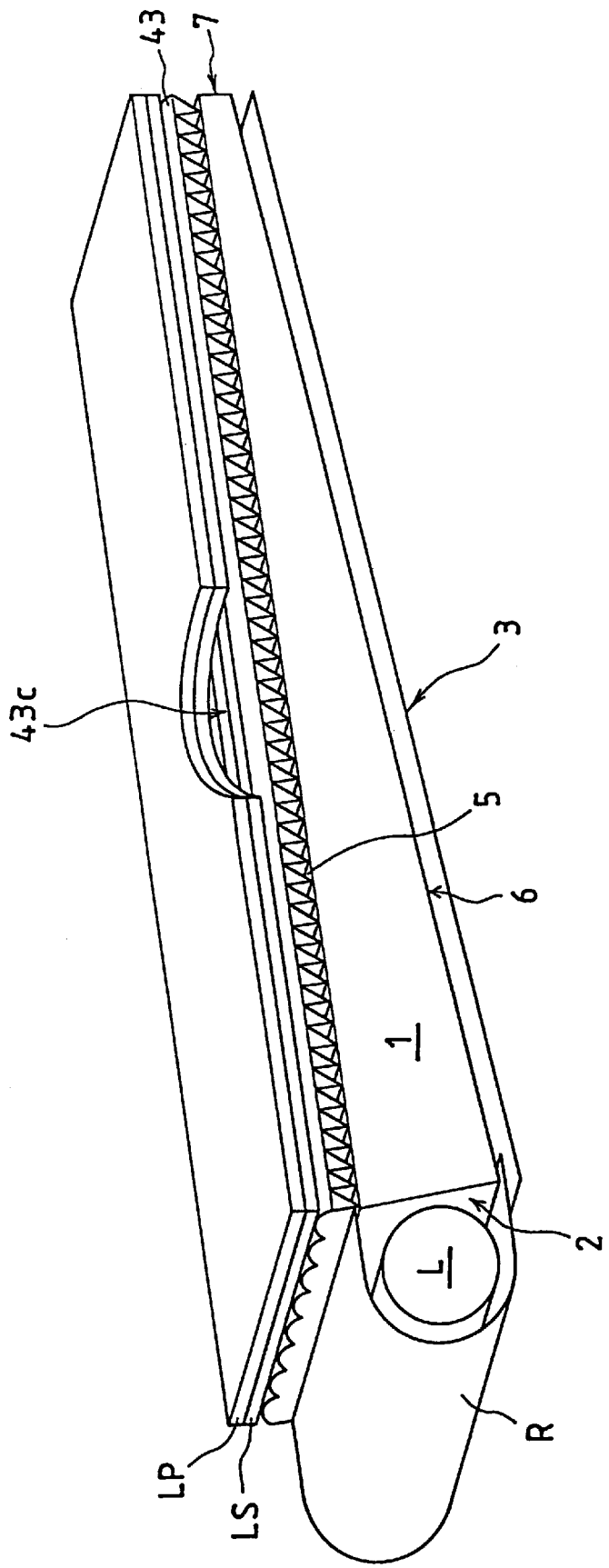
FIG. 15 is a partial cutaway perspective illustrating principal parts of a constitution of a third embodiment of the present invention.

FIG. 15 is a partial cutaway perspective illustrating principal parts of a constitution of a third embodiment of the present invention. The present embodiment is equivalent to the second embodiment of FIG. 14 with an asymmetric prism sheet 43 used instead of the asymmetric prism sheet 42. A great number of lens element rows are provided on the outer face 43c of the asymmetric prism sheet 43 substantially orthogonal to the prism element rows on the inner face. Various arrangements of the lens element rows are employable. FIG. 21~FIG. 24 illustrate several examples, showing cross-sectional views taken along a surface parallel to the light incidence surface 2 of the guide plate 1. Ray C1 represents light traveling to the frontal direction within a surface parallel to the light incidence surface 2, and ray C2 represents light traveling in a direction which deviates from the frontal direction within a surface parallel to the light incidence surface 2. Behaviour of rays C1 and C2 in each diagram is characterized as follows.

Figure 21:
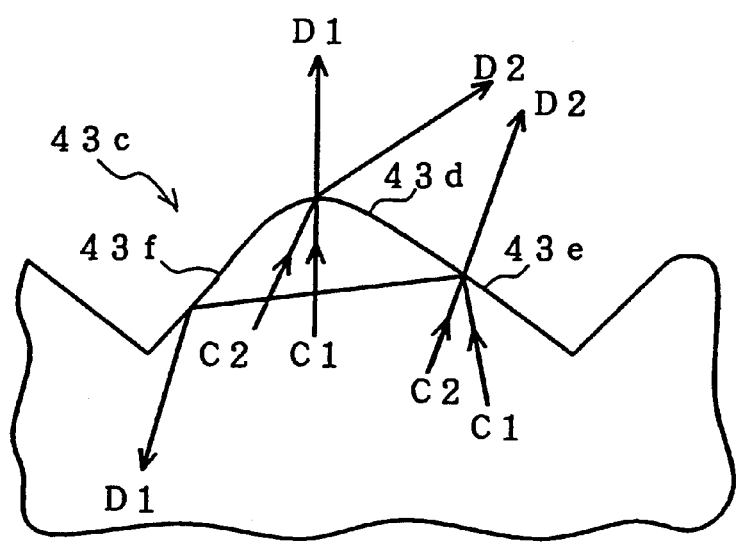
FIG. 21 is a diagram explaining an example of an embodiment of an outer face (lens surface) of an asymmetric prism sheet or an additional prism sheet, and the action thereof.

[Embodiment shown in FIG. 21]

C1 : Most of the components which are incident near the top 43d of the convex face are emitted directly to the frontal direction within a surface parallel to the light incidence surface 2, but the components which are incident to slope 43e (or 43f) are internally reflected twice in total from slopes 43e and 43f and shifted within a surface parallel to the light incidence surface 2, producing a ray D1 returning toward the inner face, whereby paths of the illuminating light are diversified as a whole.

C2: Most components which are incident near the top 43d of the convex face are refracted and emitted in various directions, but the components which are incident to the slope 43e are gathered to the frontal direction within a surface parallel to the light incidence surface 2.

Eventually, the asymmetric prism sheet 42 having a lens outer face of the embodiment in FIG. 21 gives variation to paths of the illuminating light while gently gathering light to the frontal direction within a surface parallel to the light incidence surface 2.

Figure 22:
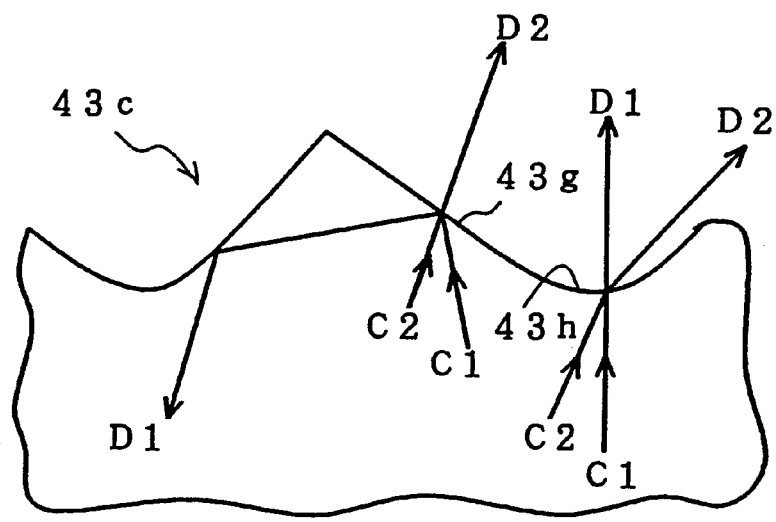
FIG. 22 is a diagram explaining an example of an embodiment of an outer face (lens surface) of an asymmetric prism sheet or an additional prism sheet, and the action thereof.

[Embodiment shown in FIG. 22]

This embodiment performs the action similar to that of the embodiment of FIG. 20, but the provision of a concave face 43h has the effect that part of the ray C1 is emitted directly to the frontal direction within a surface parallel to the light incidence surface 2 while part of the ray C2 is refracted and emitted in various directions.

Figure 23:
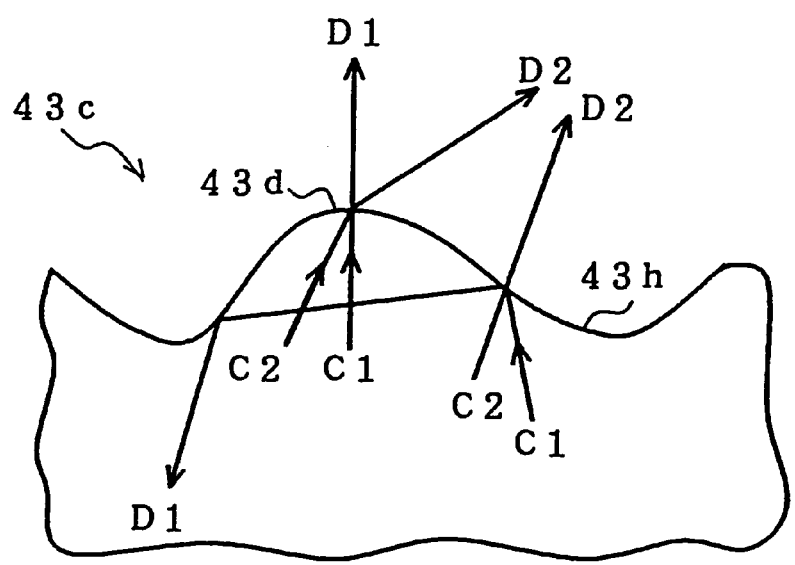
FIG. 23 is a diagram explaining an example of an embodiment of an outer face (lens surface) of an asymmetric prism sheet or an additional prism sheet, and the action thereof.

[Embodiment shown in FIG. 23]

This embodiment performs the action similar to that of the embodiment of FIG. 21, but the provision of a concave face 43h has an effect that part of the ray C1 is emitted directly to the frontal direction within a surface parallel to the light incidence surface 2, and part of the ray C2 is refracted and emitted in various directions.

Figure 24:
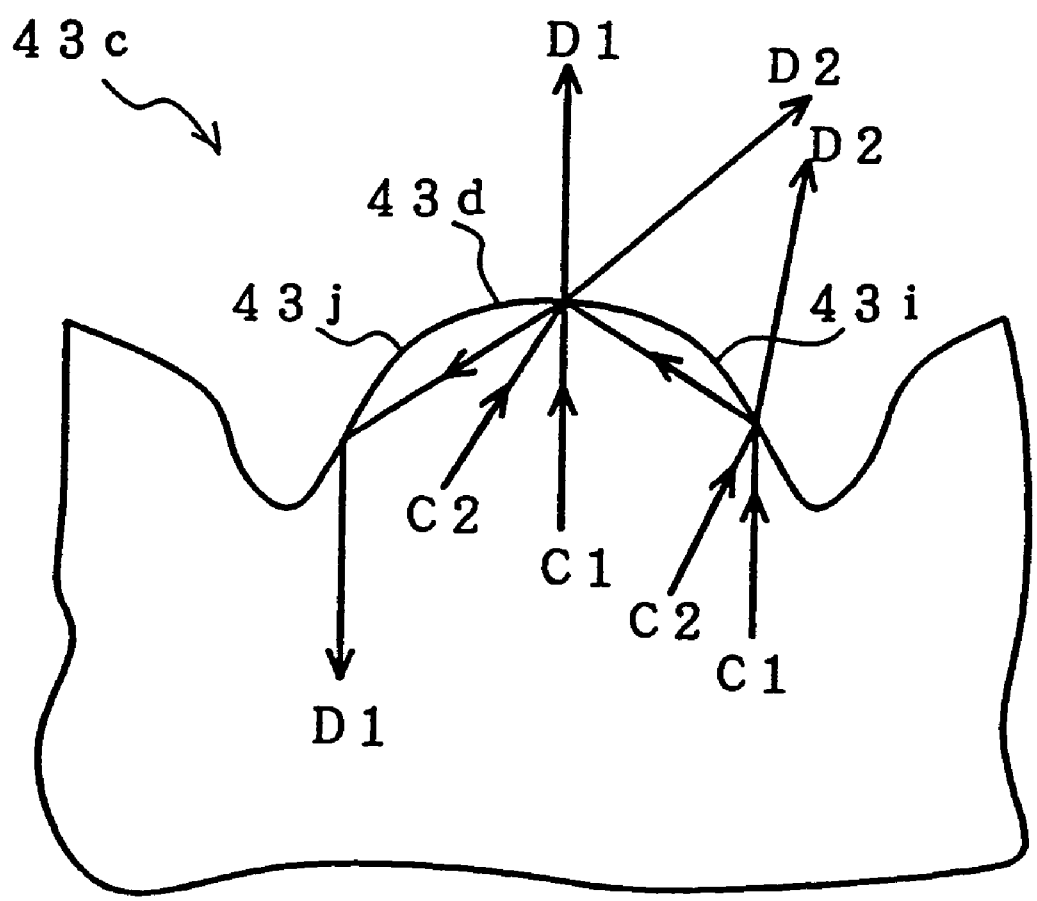
FIG. 24 is a diagram explaining an example of an embodiment of an outer face (lens surface) of an asymmetric prism sheet or an additional prism sheet, and the action thereof.

[Embodiment shown in FIG. 24]

Since a large part of the lens face 43c comprises a convex face, we can expect a strong action of gathering light to the frontal direction within a surface parallel to the light incidence surface 2 is expected. Behaviour of rays C1 and C2 has the following characteristics.

C1: Most of components which are incident near the top 43d of the convex face are emitted directly to the frontal direction within a surface parallel to the light incidence surface 2, but many of components which are incident to the wide convex face 43i (or 43j) are internally reflected three times in total from the convex faces 43i and 43j and the top 43d, and are shifted within a surface parallel to the light incidence surface 2, producing a ray D1 returning toward the inner face, whereby paths of the illuminating light are diversified as a whole.

C2: Some of components which are incident near the top 43d of the convex face are refracted and emitted in various directions, but some become returning light. Furthermore, many of components which are incident to the wide convex face 43i (or 43j) are gathered to the frontal direction within a surface parallel to the light incidence surface 2 and emitted.

Figure 25:
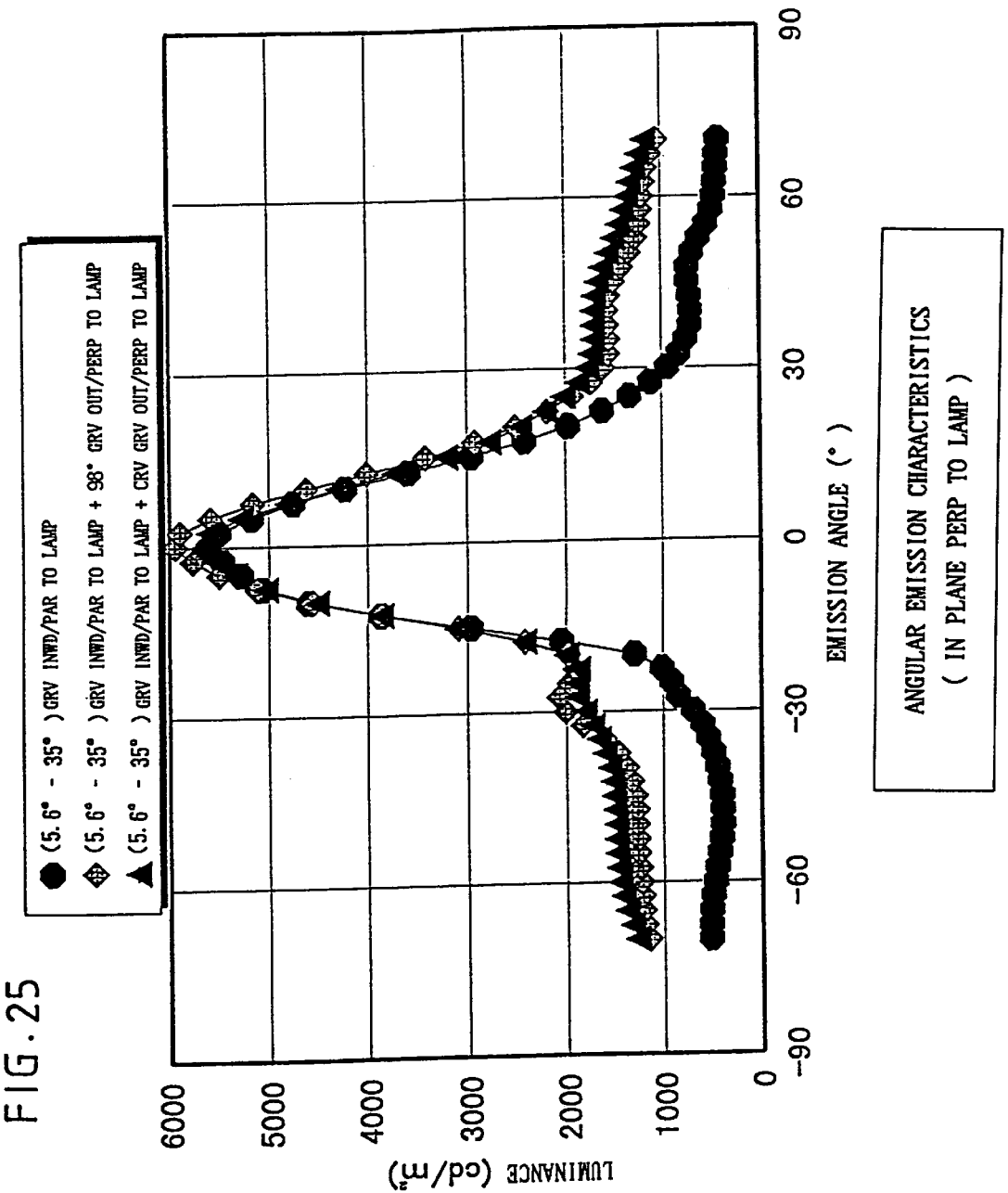
FIG. 25 is a graph illustrating examples of light-gathering effects to the frontal direction within a surface at a right angle to a light incidence surface 2 (within a surface at a right angle to a lamp) when asymmetric prism sheets 42 and 43 of the present invention are used.
Figure 26:
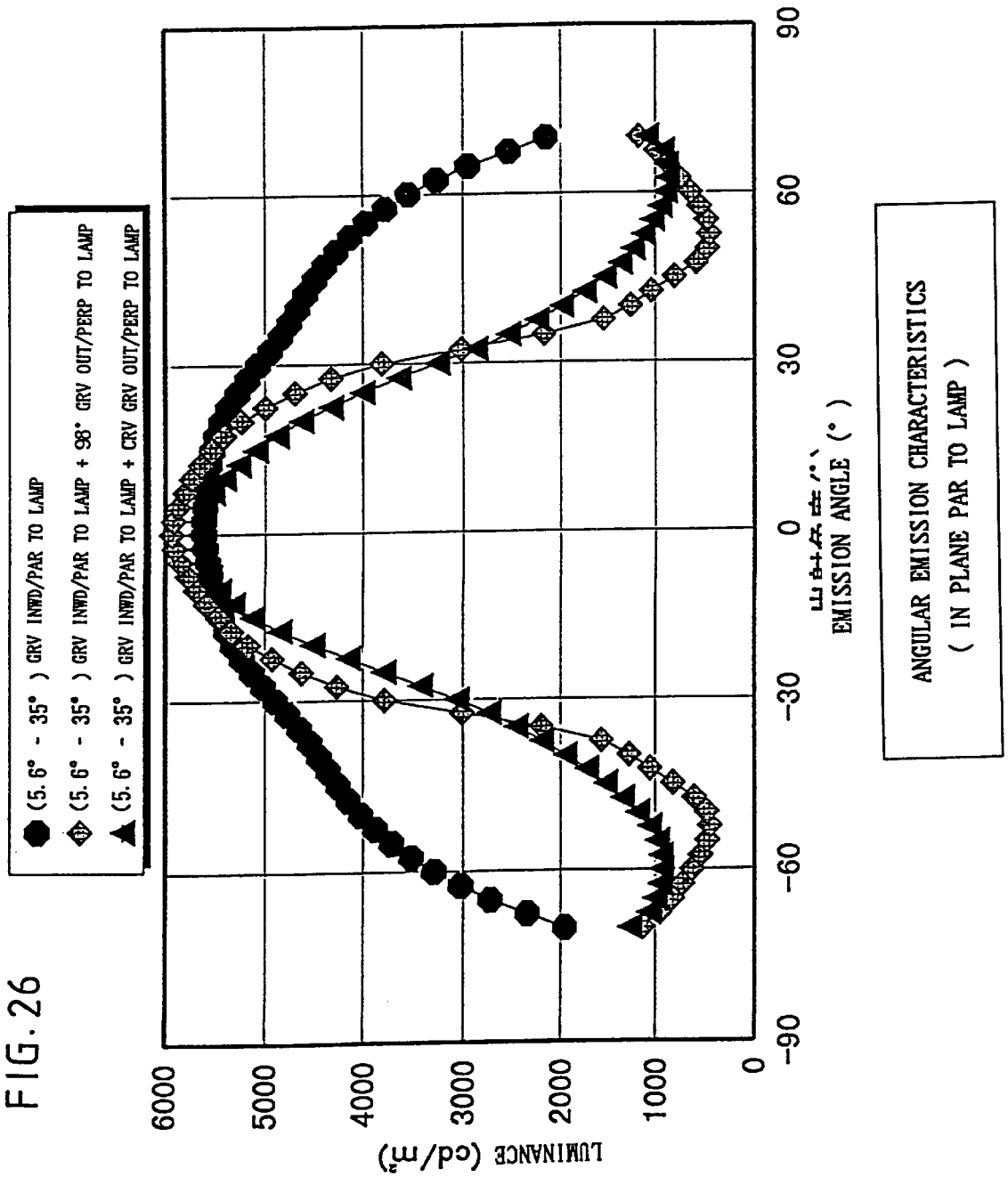
FIG. 26 is a graph illustrating examples of light-gathering effects to the frontal direction within a surface parallel to a light incidence surface 2 (within a surface parallel to a lamp) when asymmetric prism sheets 42 and 43 of the present invention are used.

FIG. 25 and FIG. 26 are graphs of examples of light-gathering effects to the frontal direction within a surface at a right angle to a light incidence surface 2 (within a surface at a right angle to a lamp) and within a surface parallel to a light incidence surface 2 (within a surface parallel to a lamp) when asymmetric prism sheets 42 and 43 of the present invention are used: (A) shows results of measurement on directional emission characteristics for a case using an asymmetric prism sheet having an even outer face and an inner face identical to that of prism sheets 41~43 to be compared with (B) for a case using the asymmetric prism sheet 42 and (C) for a case using the asymmetric prism sheet 43.

The following are understood from these diagrams.

(1) As clear from the graph of FIG. 25, when the asymmetric prism sheets 42 and 43 are used, the profile rises out of about ±30 degrees within a surface at a right angle to the lamp. The effect on brightness in the frontal direction is negligible or slight improvement.

(2) As clear from the graph of FIG. 26, when the asymmetric prism sheets 42 and 43 are used, the profile sinks out of about ±30 degrees within a surface parallel to the lamp. The effect on brightness in the frontal direction is negligible or slight improvement.

(3) As can be understood by comparing FIG. 25 with FIG. 26, when the asymmetric prism sheets 42 and 43 are used, imbalance of the profile in the left-right and up-down directions is corrected.

Figure 16:
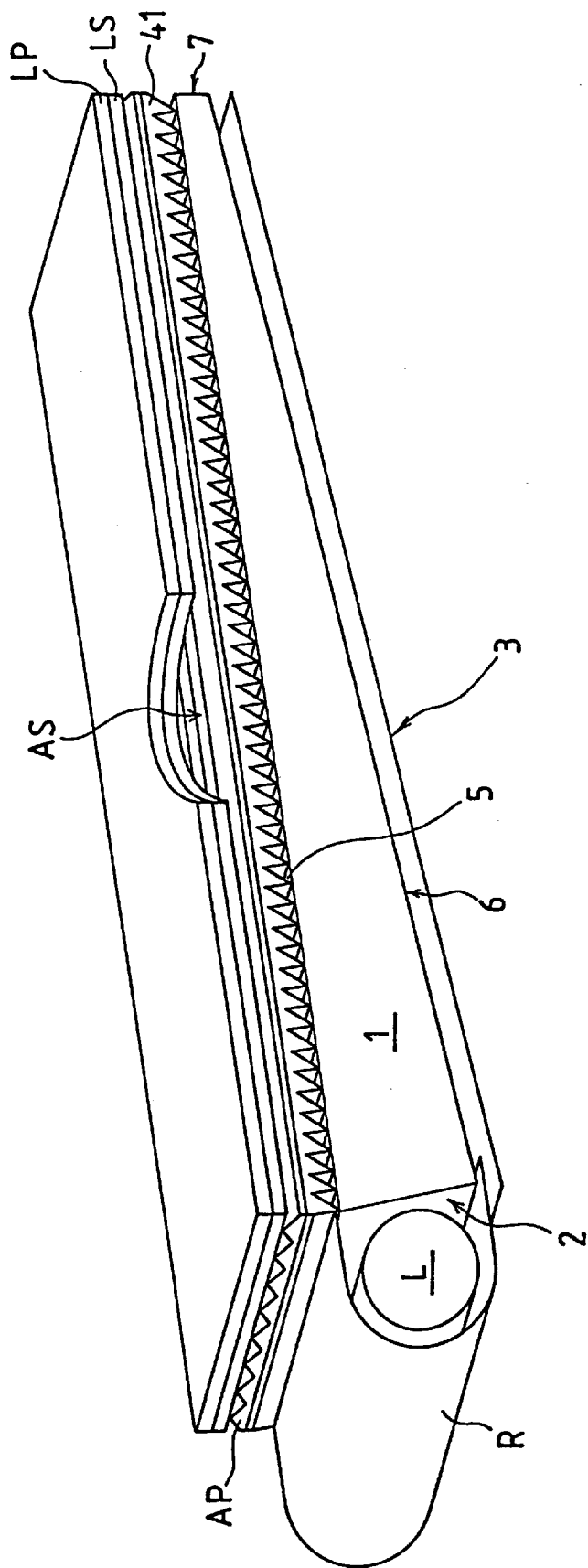
FIG. 16 is a partial cutaway perspective illustrating principal parts of a constitution of a fourth embodiment of the present invention.

Next, FIG. 16 is a partial cutaway perspective illustrating the constitution of primary parts of a fourth embodiment of the present invention. This embodiment replaces the asymmetric prism sheet 42 of the second embodiment, shown in FIG. 14, with an asymmetric prism sheet 41 and an additional prism sheet AP provided thereover.

The additional prism sheet AP, which has a non-glare-processed inner face, prevents sticking to the asymmetric prism sheet 41, interference streaks, moare streaks and the like. The outer face 41c of the asymmetric prism sheet 41 may be an even face, or a slightly non-glare-processed face.

A great number of prism element rows, identical to those provided on the outer face 42c of the double-faced asymmetric prism sheet 42 used in the second embodiment, are provided on the outer face of the additional prism sheet AP. These prism element rows are arranged substantially at a right angle to the prism element rows on the inner face of the asymmetric prism sheet 41. Since the shape and action of the prism element rows are the same as the asymmetric prism sheet 43, detailed description will be omitted here.

Figure 17:
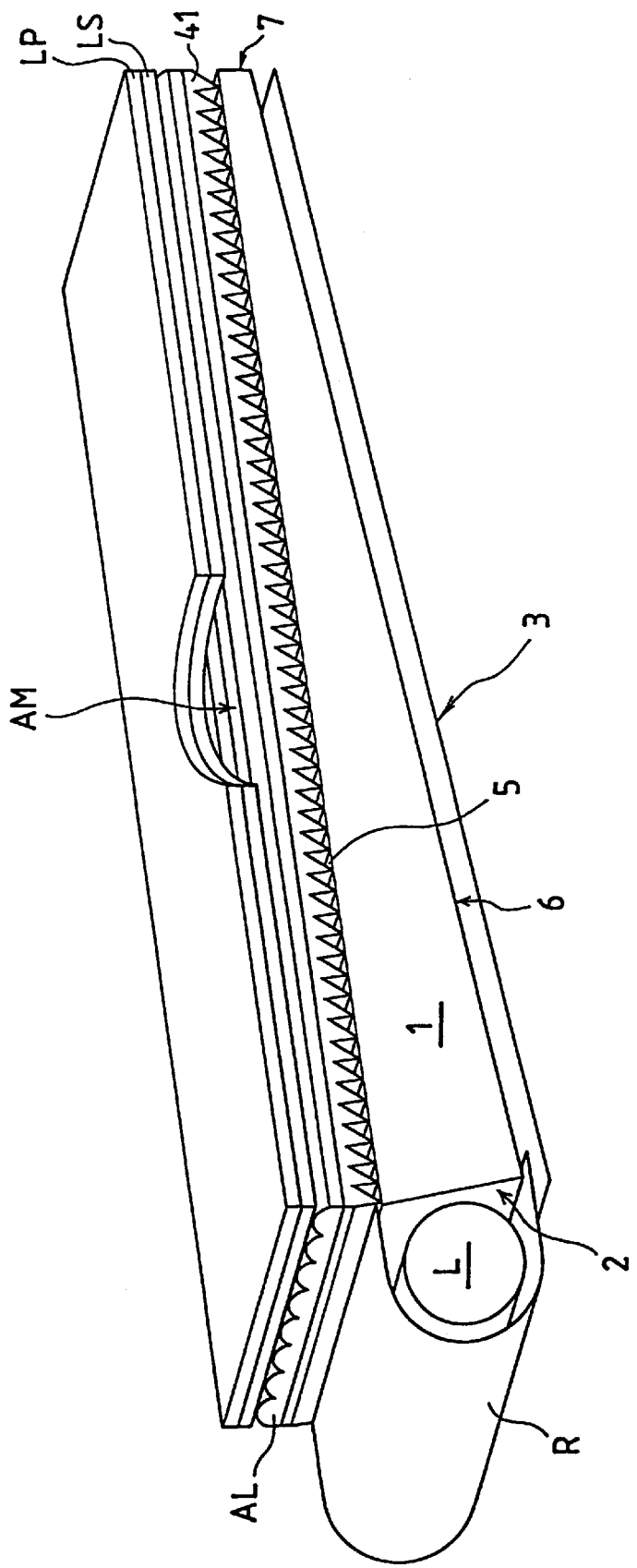
FIG. 17 is a partial cutaway perspective illustrating principal parts of a constitution of a fifth embodiment of the present invention.

FIG. 17 is a partial cutaway perspective illustrating the constitution of primary parts of a fifth embodiment of the present invention. This embodiment replaces the asymmetric prism sheet 43 of the third embodiment, shown in FIG. 15, with an asymmetric prism sheet 41 and an additional lens sheet AL provided thereover.

The additional lens sheet AL, which has a non-glare-processed inner face, prevents sticking to the asymmetric prism sheet 41, interference streaks, moare streaks and the like. The outer face 41c of the asymmetric prism sheet 41 may be an even face, a slightly non-glare-processed face.

A great number offers element rows, identical to those provided on the outer face 43c of the prism surface/lens surface asymmetric prism sheet 43 used in the third embodiment, are provided on the outer face of the additional lens sheet AL. These lens element rows are arranged substantially at a right angle to the prism element rows on the inner face of the asymmetric prism sheet 41. Since the shape and action of the lens element rows are the same as the asymmetric prism sheet 43, detailed description will be omitted here.

Figure 27:
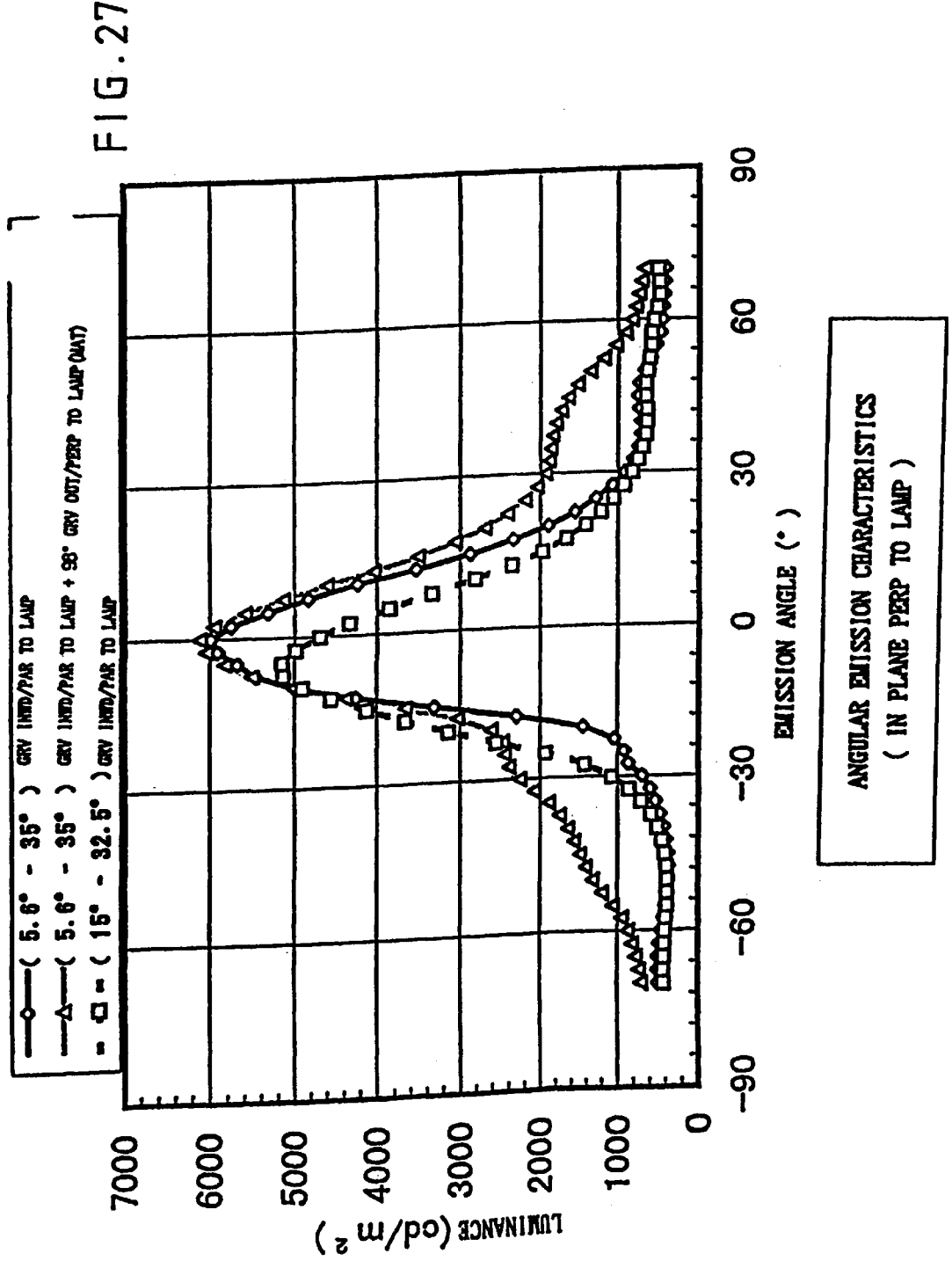
FIG. 27, together with FIG. 28, is a graph to illustrate the action of a fourth embodiment of the present invention.
Figure 28:
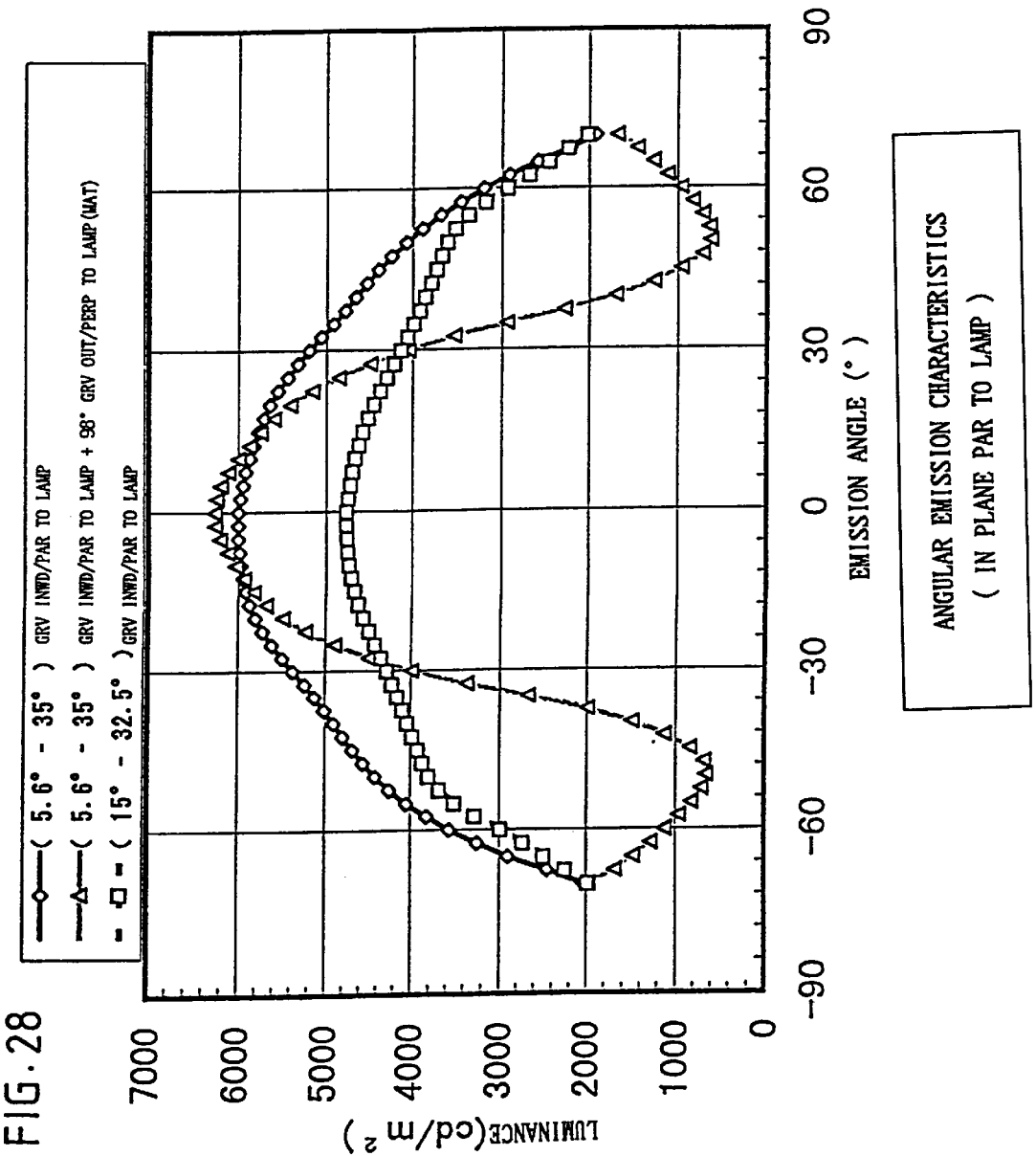
FIG. 28, together with FIG. 27, is a graph to illustrate the action of a fourth embodiment of the present invention.

FIG. 27 and FIG. 28 are graphs showing examples of the action of the fourth embodiment of the present invention. FIG. 27 depicts examples of light-gathering effects to the frontal direction within a surface at a right angle to the light incidence surface 2 (within a surface at a right angle to the lamp) and FIG. 28 depicts examples of light-gathering effects within a surface parallel to the light incidence surface 2 (within a surface parallel to the lamp): (A) shows results of measurement on directional emission characteristics for a case using an asymmetric prism sheet having an even outer face and an inner face identical to that of prism sheets 41~43 to be compared with (B) for a case using the additional prism sheet AP having a non-glare-processed face on the outer side thereof and (C) a case using a known asymmetric prism sheet having a slope angle combination of 15 degrees and –32.5 degrees.

The following are understood from these diagrams.

(1) As clear from the graphs of FIG. 27 and FIG. 28, brightness viewed from the frontal direction is increased more than when the known asymmetric prism sheet was used, both within the surface at a right angle to the lamp and within a surface parallel to the lamp.

(2) As clear from the graph of FIG. 27, the effect of the fourth embodiment causes the profile to rise more out of about ±30 degrees, within the surface at a right angle to the lamp, than when only the asymmetric prism sheet 41 is used. The effect on brightness in the frontal direction is negligible.

(3) As clear from the graph of FIG. 28, the effect of the fourth embodiment causes the profile to sink more out of about 30 degrees, within the surface parallel to the lamp, than when only the asymmetric prism sheet 41 is used. The effect on brightness in the frontal direction is negligible.

(4) As can be understood by comparing FIG. 27 and FIG. 28, when the asymmetric prism sheets 42 and 43 are used, imbalance of the profile in the left-right and up-down directions is corrected. It is reasonable to assume that this type of action will also be achieved in the fifth embodiment.

Figure 18:
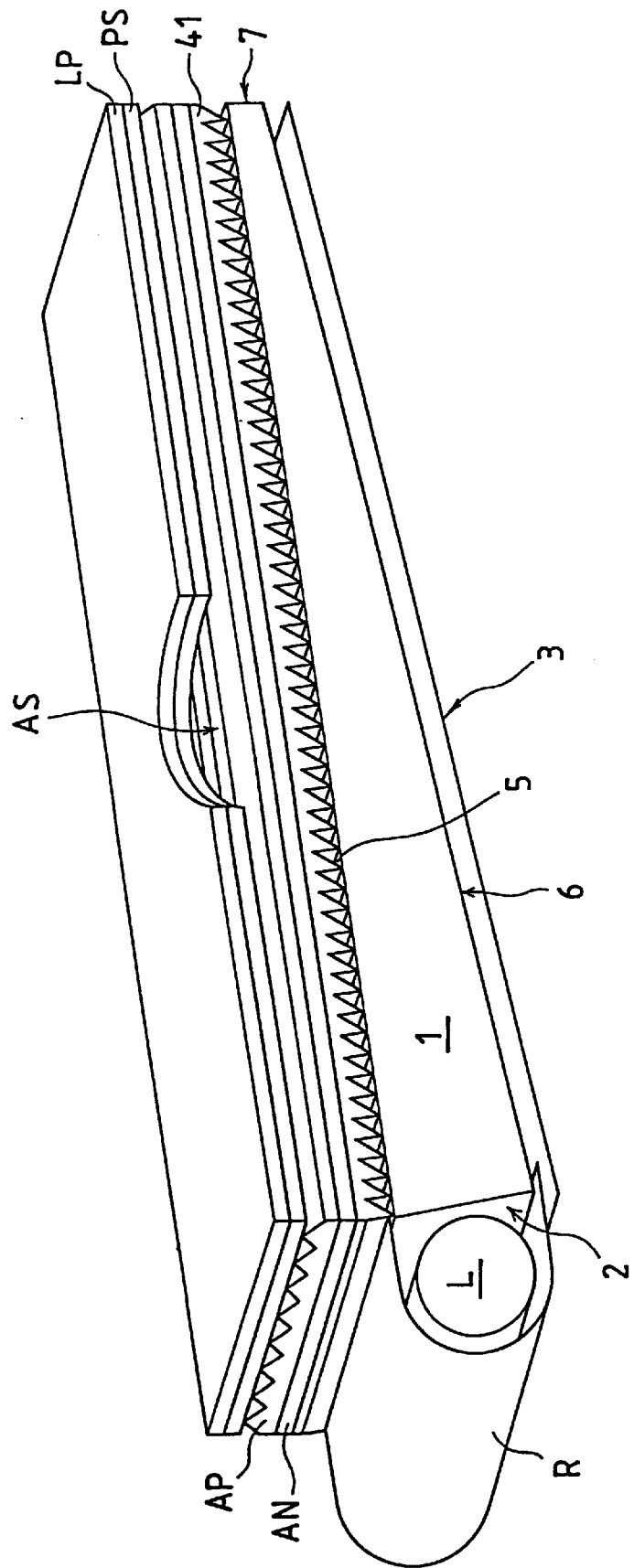
FIG. 18 is a partial cutaway perspective illustrating principal parts of a constitution of a sixth embodiment of the present invention.
Figure 19:
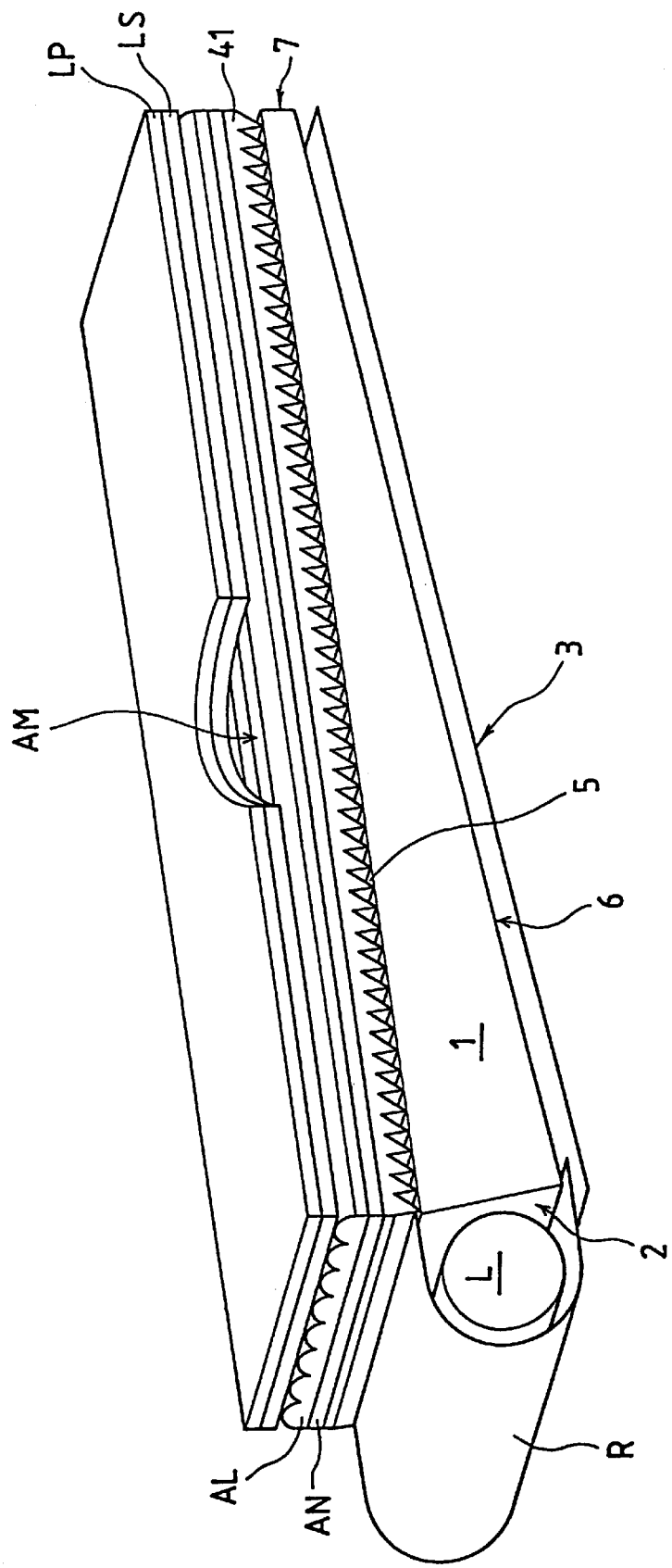
FIG. 19 is a partial cutaway perspective illustrating principal parts of a constitution of a seventh embodiment of the present invention.

Next, FIG. 18 and FIG. 19 are partial cutaway perspectives showing a sixth embodiment and a seventh embodiment of the present invention. According to these embodiments, a film AN, at least one of the surface or the under face of this film comprising a location surface, is provided between the asymmetric prism sheet 41 and the additional prism sheet AP or the additional lens sheet AL of the fourth embodiment shown in FIG. 16 and the fifth embodiment shown in FIG. 17, respectively. The film used here (product name: Anti-newton film/manufactured by Kimoto Corp) has the located face on the upper face (hereinafter, this film will be called "anti-newton film AN").

The inner face of the additional prism sheet AP and the outer face 41c of the asymmetric prism sheet 41 may be even faces, or slightly non-glare-processed faces. This is because the anti-newton film AN is capable of preventing sticking between these elements, interference streaks, moare streaks and the like.

A great number of prism element rows, identical to those provided on the outer face 42c of the double-faced prism sheet 42 used in the second embodiment, are provided on the outer face of the additional prism sheet AP. Furthermore, a great number of lens element rows, identical to those provided on the outer face 43c of the double-faced prism sheet 43 used in the third embodiment, are provided on the outer face of the additional lens sheet AL. These prism element rows and lens element rows are arranged substantially at a right angle to the prism element rows on the inner face of the asymmetric prism sheet 41.

Since the shape and action of the prism element rows and the lens element rows are the same as the asymmetric prism sheet 43, detailed description will be omitted here.

Figure 29:
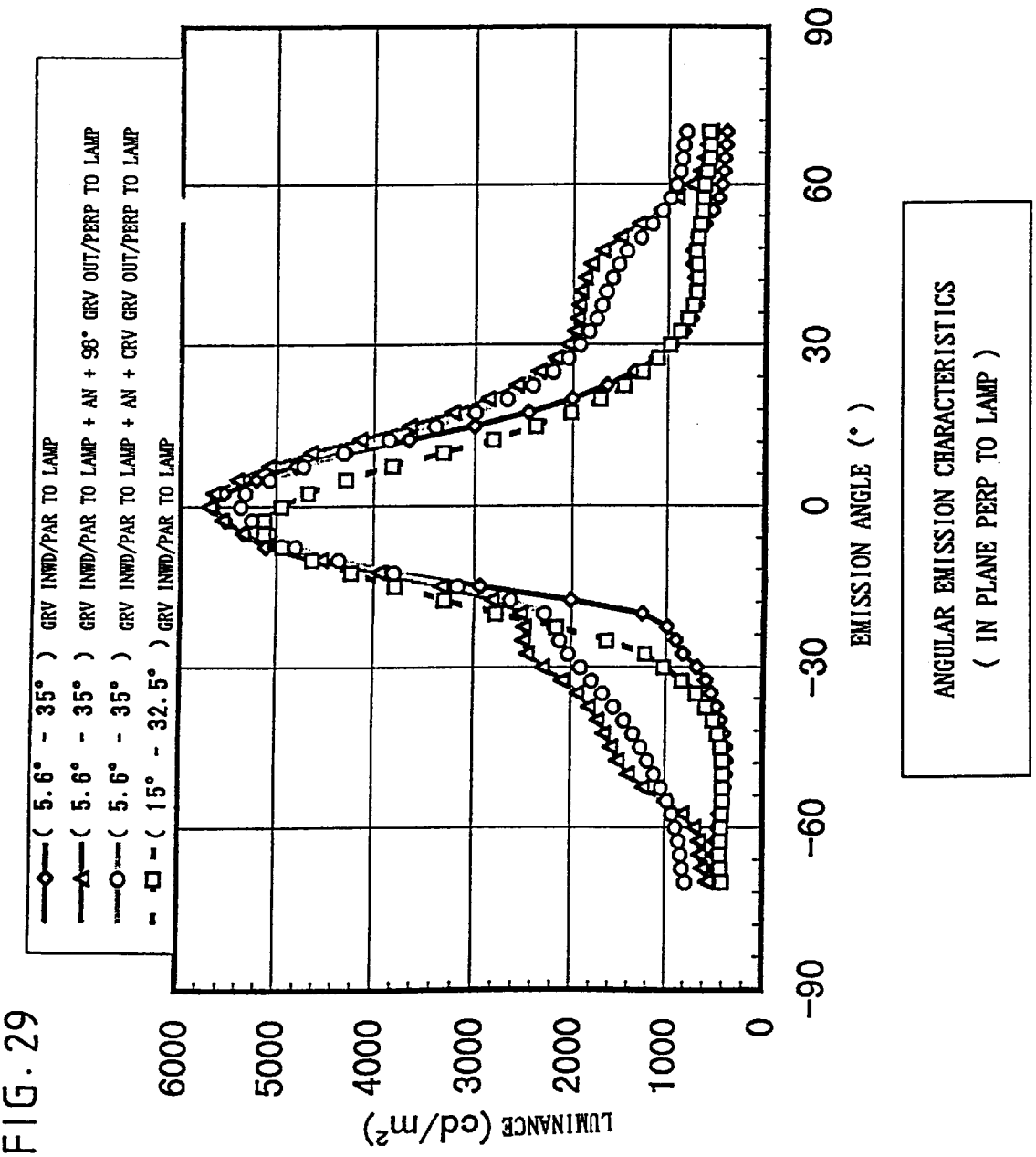
FIG. 29, together with FIG. 30, is a graph to illustrate the action of sixth and seventh embodiments of the present invention.
Figure 30:
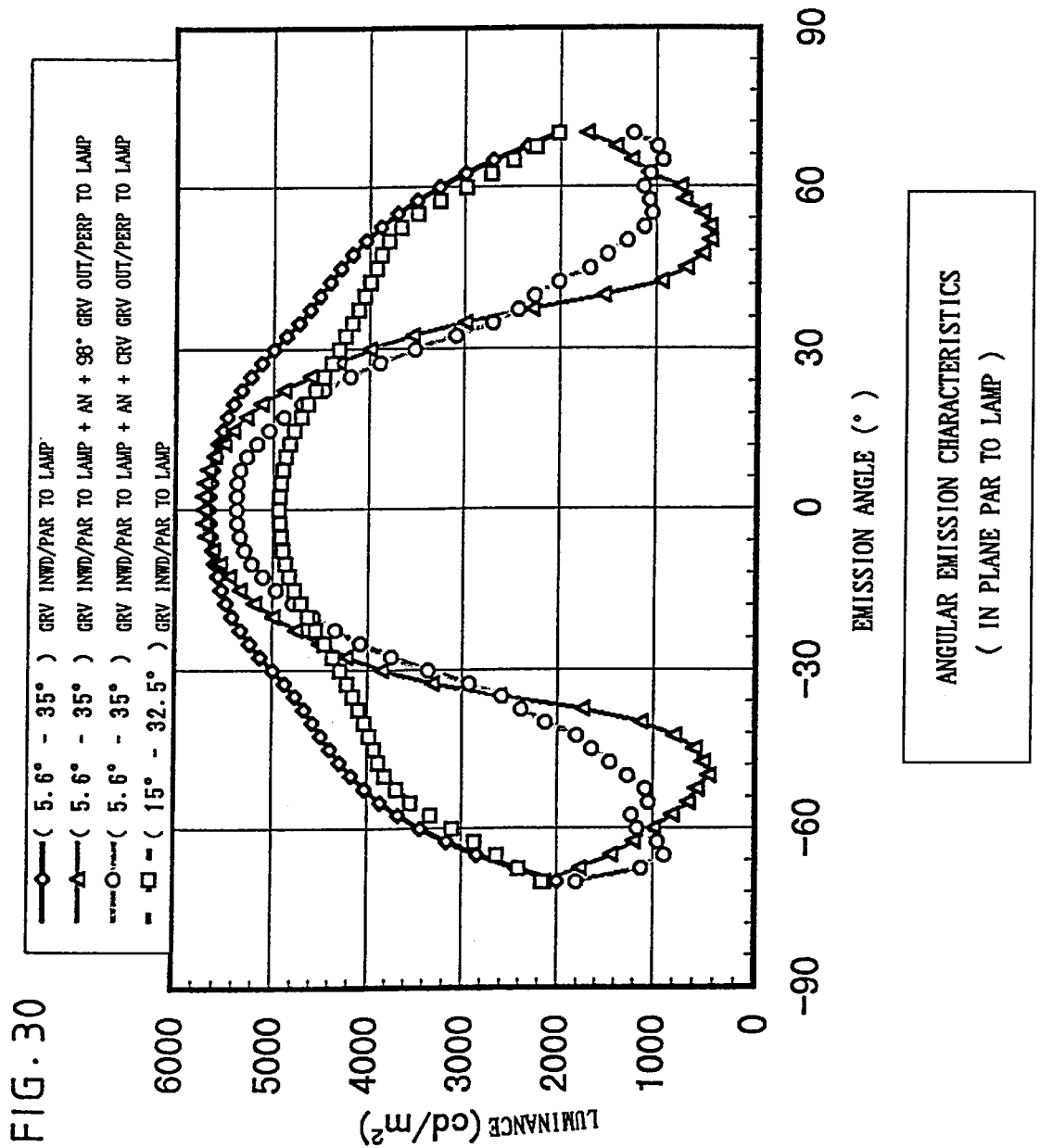
FIG. 30, together with FIG. 29, is a graph to illustrate the action of the sixth and seventh embodiments of the present invention.

FIG. 29 and FIG. 30 are graphs showing examples of the action of the sixth embodiment and seventh embodiment of the present invention. FIG. 29 depicts examples of light-gathering effects to the frontal direction within a surface at a right angle to the light incidence surface 2 (within a surface at a right angle to the lamp) and FIG. 30 depicts examples of light-gathering effects within a surface parallel to the light incidence surface 2 (within a surface parallel to the lamp): (A) shows results of measurement on directional emission characteristics for a case using an asymmetric prism sheet having an even outer face and an inner face identical to that of prism sheets 41~43 to be compared with (B) for a case using the anti-newton film AN and the additional prism sheet AP, provided on an asymmetric prism sheet which has an even outer face, (C) a case using the anti-newton film AN and the additional lens sheet AL, provided on an asymmetric prism sheet which has an even outer face, and (D) for a case using a known asymmetric prism sheet having a slope angle combination of 15 degrees and –32.5 degrees.

The following is understood from these diagrams.

(1) As clear from the graphs of FIG. 29 and FIG. 30, brightness viewed from the frontal direction is increased than when the known asymmetric prism sheet (15 degrees and –32.5 degrees) was used, both within the surface at a right angle to the lamp and within a surface parallel to the lamp.

(2) As clear from the graph of FIG. 29, implementation of the sixth or seventh embodiments causes the profile to rise slightly out of about ±30 degrees, within the surface at a right angle to the lamp.

(3) As clear from the graph of FIG. 30, the sixth or seventh embodiments causes the profile to sink more out of about ±30 degrees, within the surface parallel to the lamp, than when only the asymmetric prism sheet 41 is used.

(4) As can be understood by comparing FIG. 29 and FIG. 30, when the sixth or seventh embodiments are employed, imbalance of the profile in the left-right and up-down directions is corrected.

In addition to the above, the scope of the present invention also include a single-body constitution, obtained by treating the polarization separating sheet itself as an element having an uneven face and using optical adhesion to optically join the polarization separating sheet to the outer face of the asymmetric prism sheet to use as unibody "asymmetric prism sheet".

The features of the present invention described above can be summarized by the following points.

(1) Since each of a pair of slopes, which form the prism elements on the inner face of the prism sheet, can actively contribute to producing illuminating light traveling in the frontal direction, brightness level and uniformity of the illuminating light are improved. Furthermore, by applying the present invention to backlighting of a liquid crystal display, display quality of the liquid crystal display is improved.

(2) There is no sticking, nor any visible deterioration such as bright and dark patterns or coloring, even when elements having a flat face, such as a polarization separating sheet, are provided close together.

(3) An asymmetric prism sheet which is particularly suitable for surface light sources and LCDs is provided by the present invention..

What is claimed is:

1. A surface light source device comprising:

a directional emission guide plate;

a primary light source to supply light to an incidence surface located at a side end of said guide plate; and an asymmetric prism sheet disposed along a front surface of said guide plate, wherein said asymmetric prism sheet has a prismatic inner face provided with a plurality of prism element rows running generally parallel to said incidence surface and an uneven outer face, the prism element rows of said prismatic inner face have an alternating first slope facing to said incidence surface and second slope facing opposite to said incidence surface, and said first slope and said second slope have inclinations selected so that a main ray emitted from said guide plate is led into said asymmetric prism sheet through said first slope to be deflected toward a first approximately frontal direction by way of internal reflection of said second slope while a secondary ray, which has been emitted from said guide plate with an emission angle greater than that of the main ray, is led into said asymmetric prism sheet through said first slope to be deflected toward a second approximately frontal direction by way of internal reflection of said first slope following after the internal reflection of the second slope.

2. A surface light source device according to claim 1, wherein said uneven outer face of said asymmetric prism sheet is provided with a plurality of prism element rows running generally perpendicular to said incidence surface.

3. A surface light source device according to claim 1, wherein said uneven outer face of said asymmetric prism sheet is provided with a plurality of lens element rows running generally perpendicular to said incidence surface.

4. A surface light source device according to claim 1, wherein an additional prism sheet is disposed outside of said asymmetric prism sheet and has an outer face provided with a plurality of prism element rows running generally perpendicular to said incidence surface.

5. A surface light source device according to claim 3, wherein an additional prism sheet is disposed outside of said asymmetric prism sheet and has an outer face provided with a plurality of prism element rows running generally perpendicular to said incidence surface.

6. A surface light source device according to claim 5, wherein an additional prism sheet is disposed outside of said asymmetric prism sheet and has an outer face provided with a plurality of prism element rows running generally perpendicular to said incidence surface.

7. A surface light source device according to claim 1, wherein a lens sheet is disposed outside of said asymmetric prism sheet and has an outer face provided with a plurality of lens element rows running generally perpendicular to said incidence surface.

8. A surface light source device according to claim 2, wherein a lens sheet is disposed outside of said asymmetric prism sheet and has an outer face provided with a plurality of lens element rows running generally perpendicular to said incidence surface.

9. A surface light source device according to claim 3, wherein a lens sheet is disposed outside of said asymmetric prism sheet and has an outer face provided with a plurality of lens element rows running generally perpendicular to said incidence surface.

10. A surface light source device comprising:

a directional emission guide plate;

a primary light-source to supply light to an incidence surface located at a side end of said guide plate; and an asymmetric prism sheet disposed along a front surface of said guide plate, wherein said asymmetric prism sheet has a prismatic inner face provided with a plurality of prism element rows running generally parallel to said incidence surface and an uneven outer face, the prism element rows of said prismatic inner face have an alternating first slope facing to said incidence surface and second slope facing opposite to said incidence surface, said first slope and said second slope have inclinations selected so that a main ray emitted from said guide plate is led into said asymmetric prism sheet through said first slope to be deflected toward a first generally frontal direction by way of internal reflection of said second slope while a secondary ray, which has been emitted from said guide plate with an emission angle greater than that of the main ray, is led into said asymmetric prism sheet through said first slope to be deflected toward a second generally frontal direction by way of internal reflection of said first slope following after internal reflection of the second slope, and an additional prism sheet is disposed outside of said asymmetric prism sheet and has an outer face and an inner face, with the outer face being provided with a plurality of prism element rows running generally perpendicular to said incidence surface, and the inner face being provided with a non-glare-processed face.

11. A surface light source device comprising:

a directional emission guide plate;

a primary light source to supply light to an incidence surface located at a side end of said guide plate; and an asymmetric prism sheet disposed along a front surface of said guide plate, wherein said asymmetric prism sheet has a prismatic inner face provided with a plurality of prism element rows running generally parallel to said incidence surface and an uneven outer face, the prism element rows of said prismatic inner face have an alternating first slope facing to said incidence surface and second slope facing opposite to said incidence surface, said first slope and said second slope have inclinations selected so that a main ray emitted from said guide plate is led into said asymmetric prism sheet through said first slope to be deflected toward a first generally frontal direction by way of internal reflection of said second slope while a secondary ray, which has been emitted from said guide plate with an emission angle greater than that of the main ray, is led into said asymmetric prism sheet through said first slope to be deflected toward a second generally frontal direction by way of internal reflection of said first slope following after internal reflection of the second slope, and a lens sheet is disposed outside of said asymmetric prism sheet and has an outer face and an inner face, with the outer face being provided with a plurality of lens element rows running generally perpendicular to said incidence surface, and the inner face being provided with a non-glare-processed face.

12. A surface light source device, comprising:

a directional emission guide plate;

a primary light source to supply light to an incidence surface located at a side end of said guide plate; and an asymmetric prism sheet disposed along a front surface of said guide plate, wherein said asymmetric prism sheet has a prismatic inner face provided with a plurality of prism element rows running generally parallel to said incidence surface and an uneven outer face, the prism element rows of said prismatic inner face is have an alternating first slope facing to said incidence surface and second slope facing opposite to said incidence surfaced, said first slope and said second slope have inclinations selected so that a main ray emitted from said guide plate is led into said asymmetric prism sheet through said first slope to be deflected toward a first generally frontal direction by way of internal reflection of said second slope while a secondary ray, which has been emitted from said guide plate with an emission angle greater than that of the main ray, is led into said asymmetric prism sheet through said first slope to be deflected toward a second generally frontal direction by way of internal reflection of said first slope following after internal reflection of the second slope, and a film is disposed outside of said asymmetric prism sheet, with at at least one face of the film having a mat face.

13. A surface light source device according to claims 1, 2 or 3, wherein inclination angle φa of said first slope with respect to a just frontal direction of said guide plate is smaller than 10 degrees.

14. An asymmetric prism sheet comprising a prismatic face provided with a plurality of asymmetric prism element rows and an uneven face, wherein said asymmetric prism element rows have an alternating first slope and second slope, with said second slope facing opposite to said first slope, said first slope and said second slope have inclination values which allow a first ray and a second ray to exist together so that the first ray is led into said asymmetric prism sheet through said first slope to be deflected toward a first approximately frontal direction by way of internal reflection of said second slope while the second ray is led into said asymmetric prism sheet through said first slope to be deflected toward a second approximately frontal direction by way of internal reflection of said first slope following after internal reflection of the second slope, and each of said first ray and said second ray has a positive approach angle with respect to said asymmetric prism sheet under a condition such that approach angles of rays approaching from top side of said prismatic element are defined as positive in sign.

15. An asymmetric prism sheet according to claim 14, wherein an inclination angle φa of said first slope with respect to a just frontal direction is smaller than 10 degrees, and an inclination angle φb of said second slope with respect to said just frontal direction falls within a range from 30 to 40 degrees.

16. An asymmetric prism sheet according to claim 14, wherein said uneven face has a non-glare-processed face.

17. An asymmetric prism sheet according to claim 15, wherein said uneven face consists of a non-glare-processed face.

18. An asymmetric prism sheet according to claim 14, wherein said uneven face is provided with a plurality of prism element rows running generally perpendicular to said asymmetric prism element rows.

19. An asymmetric prism sheet according to claim 15, wherein said uneven face is provided with a plurality of prism element rows running generally perpendicular to said asymmetric prism element rows.

20. An asymmetric prism sheet according to claim 14, wherein said uneven face is provided with a plurality of lens element rows running generally perpendicular to said asymmetric prism element rows.

21. An asymmetric prism sheet according to claim 14, wherein said uneven face is provided with a plurality of lens element rows running generally perpendicular to said asymmetric prism element rows.

* * * * *

UNITED STATES PATENT AND TRADEMARK OFFICE
CERTIFICATE OF CORRECTION

PATENT NO.    : 6,222,689 B1
DATED         : April 24, 2001
INVENTOR(S)   : Eizaburo Higuchi et al It is certified that error appears in the above-identified patent and that said Letters Patent is hereby corrected as shown below:

<u>Title Page,</u>
Item 75, "Setagaya-ku" to-- Tokyo--;
Delete "534-23, Ichigaocho, Midori-ku,"
Delete "Kanagawa, 225-0002,"

<u>Column 1</u>
Line 7, delete [(]

<u>Column 3,</u>
Line 61, delete [=], both occurrences.

<u>Column 21,</u>
Line 42, change "surfaced" to -- surface -- .

<u>Column 22,</u>
Line 37, change " consists of" to -- has-- .

Signed and Sealed this

Twenty-eighth Day of August, 2001

*Attest:*

NICHOLAS P. GODICI
*Attesting Officer*    Acting Director of the United States Patent and Trademark Office